US009980201B2

(12) United States Patent
Gunnarsson et al.

(10) Patent No.: US 9,980,201 B2
(45) Date of Patent: *May 22, 2018

(54) BASE-STATION-TO-BASE-STATION GATEWAY AND RELATED DEVICES, METHODS, AND SYSTEMS

(71) Applicant: Telefonaktiebolaget L M Ericsson (publ), Stockholm (SE)

(72) Inventors: Fredrik Gunnarsson, Linköping (SE); Stefan Engström, Linköping (SE); Gino Luca Masini, Stockholm (SE); Karl Norrman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/077,189

(22) Filed: Mar. 22, 2016

(65) Prior Publication Data

US 2016/0205060 A1    Jul. 14, 2016

Related U.S. Application Data

(63) Continuation of application No. 14/068,744, filed on Oct. 31, 2013, now Pat. No. 9,326,218.
(Continued)

(51) Int. Cl.
*H04W 40/24*    (2009.01)
*H04L 12/741*    (2013.01)
(Continued)

(52) U.S. Cl.
CPC ......... *H04W 40/248* (2013.01); *H04L 45/745* (2013.01); *H04L 61/15* (2013.01);
(Continued)

(58) Field of Classification Search
CPC ... H04W 84/045; H04W 88/02; H04W 88/08; H04W 88/16; H04W 88/182;
(Continued)

(56) References Cited

U.S. PATENT DOCUMENTS 8,713,658 B1    4/2014  Tidd
9,007,911 B2    4/2015  Xi et al.
(Continued)

FOREIGN PATENT DOCUMENTS

CN    101815256 A    8/2010
EP    1385316 A1    1/2004
(Continued)

OTHER PUBLICATIONS

Examination Report for European Patent Application No. 13792992.3, dated Jul. 15, 2016, 5 pages.
(Continued)

*Primary Examiner* — Yemane Mesfin
*Assistant Examiner* — Peter Chen
(74) *Attorney, Agent, or Firm* — Withrow & Terranova, PLLC

(57) ABSTRACT

The present disclosure relates to a base-station-to-base-station (BS-BS) gateway in a Long Term Evolution (LTE) cellular communication network and methods of operation thereof. In one embodiment, the BS-BS gateway receives information from a first base station which includes a hostname and a network address of the first base station. The BS-BS gateway then stores a mapping between the hostname and the network address. Thereafter, in one embodiment, the BS-BS gateway enables a second base station to address messages to the first base station using the hostname of the first base station. In this manner, changes in the network address of the first base station will not affect the ability of the second base station to address messages to the
(Continued)

first base station. In some embodiments, the first base station is a low-power base station (LP-BS) and the second base station is a high-power base station (HP-BS).

16 Claims, 18 Drawing Sheets

Related U.S. Application Data

(60) Provisional application No. 61/721,745, filed on Nov. 2, 2012.

(51) Int. Cl.

| | | |
|---|---|---|
| *H04W 52/02* | (2009.01) | |
| *H04W 88/08* | (2009.01) | |
| *H04W 88/16* | (2009.01) | |
| *H04W 88/18* | (2009.01) | |
| *H04W 84/04* | (2009.01) | |
| *H04W 92/20* | (2009.01) | |
| *H04W 88/02* | (2009.01) | |
| *H04L 29/12* | (2006.01) | |

(52) U.S. Cl.
CPC ........ *H04L 61/2076* (2013.01); *H04L 61/304* (2013.01); *H04W 52/0206* (2013.01); *H04W 92/20* (2013.01); *H04W 84/045* (2013.01); *H04W 88/02* (2013.01); *H04W 88/08* (2013.01); *H04W 88/16* (2013.01); *H04W 88/182* (2013.01); *Y02B 60/50* (2013.01)

(58) Field of Classification Search
CPC . H04W 36/0022; H04W 64/00; H04W 80/04; H04W 92/20; H04W 76/02; H04W 52/0206; H04W 40/248; H04L 29/06027; H04L 45/745; H04L 61/15; H04L 61/304; H04L 61/2076; Y02B 60/50
See application file for complete search history.

(56) References Cited

U.S. PATENT DOCUMENTS

| | | | |
|---|---|---|---|
| 9,131,424 B2 | 9/2015 | Xu et al. | |
| 9,326,218 B2 | 4/2016 | Gunnarsson et al. | |
| 2005/0022008 A1* | 1/2005 | Goodman | G06Q 10/107 726/4 |
| 2005/0157726 A1 | 7/2005 | Vesterinen | |
| 2008/0101357 A1 | 5/2008 | Iovanna et al. | |
| 2009/0207855 A1 | 8/2009 | Watanabe | |
| 2010/0039987 A1 | 2/2010 | Hegde et al. | |
| 2010/0041405 A1* | 2/2010 | Gallagher | H04W 8/02 455/436 |
| 2010/0248723 A1 | 9/2010 | Yasuoka | |
| 2011/0021185 A1 | 1/2011 | Hapsari et al. | |
| 2011/0044284 A1 | 2/2011 | Voltolina et al. | |
| 2011/0287772 A1 | 11/2011 | Park et al. | |
| 2011/0310791 A1 | 12/2011 | Prakash et al. | |
| 2012/0106488 A1* | 5/2012 | Nylander | H04L 29/12066 370/329 |
| 2012/0188984 A1* | 7/2012 | Takahashi | H04W 36/0083 370/331 |
| 2012/0258724 A1 | 10/2012 | Kim et al. | |
| 2013/0051316 A1 | 2/2013 | Bhatt et al. | |
| 2013/0064092 A1 | 3/2013 | Xi et al. | |
| 2013/0281097 A1 | 10/2013 | Jung | |
| 2013/0322390 A1* | 12/2013 | Xu | H04W 76/02 370/329 |
| 2014/0126562 A1 | 5/2014 | Gunnarsson et al. | |
| 2014/0128086 A1 | 5/2014 | Gunnarsson et al. | |
| 2015/0109999 A1* | 4/2015 | Godin | H04W 92/20 370/328 |
| 2015/0215774 A1 | 7/2015 | Huang et al. | |
| 2015/0289302 A1 | 10/2015 | Xu et al. | |
| 2017/0013537 A1 | 1/2017 | Gunnarsson et al. | |

FOREIGN PATENT DOCUMENTS

| | | |
|---|---|---|
| EP | 2230864 A1 | 9/2010 |
| JP | 2009152691 A | 7/2009 |
| JP | 2009188767 A | 8/2009 |
| JP | 2011166432 A | 8/2011 |
| WO | 2010047647 A1 | 4/2010 |
| WO | 2012093893 A2 | 7/2012 |
| WO | 2014019777 A1 | 2/2014 |

OTHER PUBLICATIONS

Author Unknown, "Technical Specification Group Core Network and Terminals; Characteristics of the Universal Subscriber Identity Module (USIM) application (Release 11)," Technical Specification 31.102, Version 11.3.0, 3GPP Organizational Partners, Sep. 2012, 228 pages.

Author Unknown, "Technical Specification Group Core Network and Terminals; Domain Name System Procedures; Stage 3 (Release 11)," Technical Specification 29.303, Version 11.2.0, 3GPP Organizational Partners, Sep. 2012, 57 pages.

Author Unknown, "Technical Specification Group Core Network and Terminals; Numbering, addressing and identification (Release 11)," Technical Specification 23.003, Version 11.3.0, 3GPP Organizational Partners, Sep. 2012, 83 pages.

Author Unknown, "Technical Specification Group Radio Access Network; Evolved Universal Terrestrial Radio Access Network (E-UTRAN); S1 signalling transport (Release 11)," Technical Specification 36.412, Version 11.0.0, 3GPP Organizational Partners, Sep. 2012, 8 pages.

Author Unknown, "Technical Specification Group Radio Access Network; Evolved Universal Terrestrial Radio Access Network (E-UTRAN); X2 signalling transport (Release 11)," Technical Specification 36.422, Version 11.0.0, 3GPP Organizational Partners, Sep. 2012, 8 pages.

Author Unknown, "Technical Specification Group Radio Access Network; Universal Mobile Telecommunications System (UMTS) and LTE; Mobility enhancements for Home Node B (HNB) and Home enhanced Node B (HeNB) (Release 11)," Technical Report 37.803, Version 11.0.0, 3GPP Organizational Partners, Jun. 2012, 120 pages.

Author Unknown, "Technical Specification Group Radio Access Network; Universal Mobile Telecommunications System (UMTS) and LTE; Mobility enhancements for Home Node B (HNB) and Home enhanced Node B (HeNB) (Release 11)," Technical Report 37.803, Version 11.2.0, 3GPP Organizational Partners, Jun. 2013, 116 pages.

Deering, S. et al., "Internet Protocol, Version 6 (IPv6)," Request for Comments: 2460, Standards Track, Dec. 1998, The Internet Society, 39 pages.

Nokia Siemens Networks, "R3-122183: X2-Gateway—Further details on the way forward," 3rd Generation Partnership Project (3GPP), TSG-RAN WG3 Meeting #77bis, Oct. 8-12, 2012, 4 pages, Lecce, Italy.

NSN, "R3-131690: How to handle the HeNB switch off," 3rd Generation Partnership Project (3GPP), TSG-RAN WG3 Meeting #81bis, Oct. 7-11, 2013, 4 pages, Venice, Italy.

Ericsson, "R3-131780: On the HeNB Registration Procedure with the X2-GW," 3rd Generation Partnership Project (3GPP), TSG-RAN WG3 #81bis, Oct. 7-11, 2013, Venice, Italy, 3 pages.

Huawei et al., "R3-121536: Introduction of connectivity between HNBs and RNCs via the HNB-GW for RNSAP signalling," 3rd Generation Partnership Project (3GPP), TSG-RAN3 Meeting #77; Aug. 13-17, 2012, Qingdao, China, 10 pages.

Zeichick, Alan, "TZO Premiere Dynamic DNS Service," Smart Partner, www.zdnet.com/sp/stories/issue/0,4537,2409608,00.html, Dec. 12, 1999, Tzolkin Corporation, 1 page.

(56) References Cited

OTHER PUBLICATIONS

Stewart, R., "Stream Control Transmission Protocol," Request for Comments: 4960, Standards Track, Sep. 2007, The IETF Trust, 153 pages.
Non-Final Office Action for U.S. Appl. No. 14/068,744, dated Jul. 6, 2015, 24 pages.
Notice of Allowance and Examiner-Initiated Interview Summary for U.S. Appl. No. 14/068,744, dated Dec. 21, 2015, 15 pages.
Notice of Reasons for Rejection for Japanese Patent Application No. 2015-540259, dated May 17, 2016, 7 pages.
International Search Report and Written Opinion for PCT/IB2013/059857, dated Mar. 25, 2014, 15 pages.
International Preliminary Report on Patentabilty for International Patent Application No. PCT/IB2013/059857, dated May 14, 2015, 11 pages.
Non-Final Office Action for U.S. Appl. No. 14/068,755, dated Feb. 27, 2015, 15 pages.
Non-Final Office Action for U.S. Appl. No. 14/068,755, dated Dec. 1, 2015, 54 pages.
Notice of Allowance for U.S. Appl. No. 14/068,755, dated May 27, 2016, 8 pages.
Patent Examination Report No. 1 for Australian Patent Application No. 2013340347, dated Oct. 1, 2015, 3 pages.
International Search Report and Written Opinion for PCT/IB2013/059854 dated Feb. 7, 2014, 12 pages.
International Preliminary Report on Patentability for International Patent Application No. PCT/IB2013/059854, dated May 14, 2015, 8 pages.
English Translation of the Decision of Rejection for Japanese Patent Application No. 2015-540259, dated Feb. 7, 2017, 4 pages.
Notice of Acceptance for Australian Patent Application No. 2013340347, dated Sep. 16, 2016, 2 pages.
First Office Action for Chinese Patent Application No. 201380069218.6, dated Feb. 24, 2018, 19 pages.
First Office Action for Chinese Patent Application No. 201380069220.3, dated Jan. 28, 2018, 32 pages.

\* cited by examiner

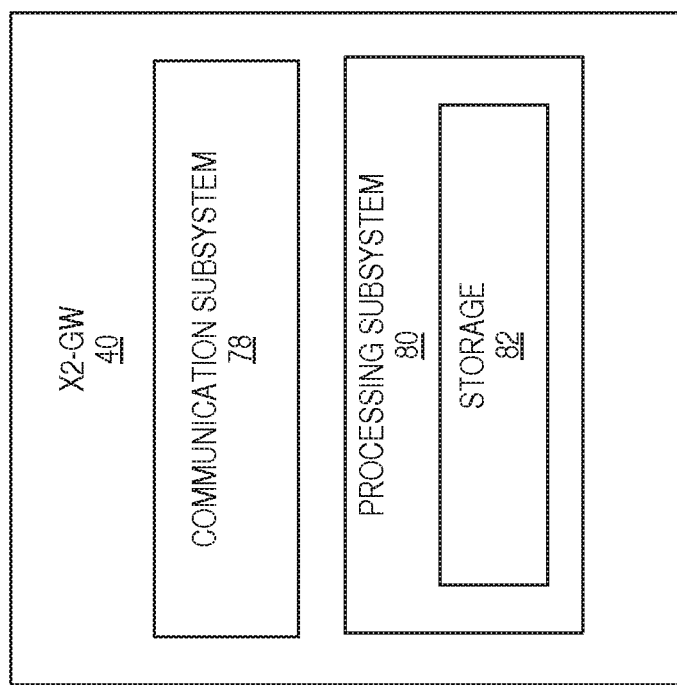

BASE-STATION-TO-BASE-STATION GATEWAY AND RELATED DEVICES, METHODS, AND SYSTEMS

RELATED APPLICATIONS

This application is a Continuation of U.S. patent application Ser. No. 14/068,744, filed Oct. 31, 2013, now issued as U.S. Pat. No. 9,326,218, which claims the benefit of provisional patent application Ser. No. 61/721,745, filed Nov. 2, 2012, the disclosures of which are hereby incorporated herein by reference in their entireties.

This application is also related to U.S. patent application Ser. No. 14/068,755, entitled METHODS FOR BASE-STATION-TO-BASE-STATION CONNECTION MANAGEMENT, which was filed Oct. 31, 2013, which is commonly owned and assigned and is hereby incorporated herein by reference in its entirety.

FIELD OF THE DISCLOSURE

The present disclosure relates to a base-station-to-base-station gateway in a cellular communication network.

BACKGROUND

A conventional Long Term Evolution (LTE) cellular communication network 10, as shown in FIG. 1, includes a Radio Access Network (RAN) 12 including a number of Evolved/E-UTRAN Node Bs (eNBs) 14-1 through 14-3 (generally referred to herein collectively as eNBs 14 and individually as eNB 14) that provide wireless radio access to wireless devices, otherwise known as user equipment devices (UEs) (not shown). The eNBs 14 communicate with one another via X2 connections and communicate with a core network 16 via S1 connections. The core network 16 includes one or more Mobility Management Entities (MMEs) 18, which are control nodes that are responsible for, among other things, tracking UEs as they move through the LTE cellular communication network 10. The MMEs 18 are also responsible for assigning the UEs to Serving-Gateways (S-GWs) 20. The S-GWs 20 route and forward user data packets, while also acting as mobility anchors for the user plane during inter-eNB handovers and as anchors for mobility between LTE and other $3^{rd}$ Generation Partnership Project (3GPP) technologies.

FIG. 2 illustrates a heterogeneous deployment of both eNBs 14 and Home Evolved/E-UTRAN Node Bs (HeNBs) 22-1 through 22-3 (generally referred to herein collectively as HeNBs 22 and individually as HeNB 22) that has been proposed to improve coverage and increase capacity of the LTE cellular communication network 10. The addition of low-power base stations (LP-BSs), such as the HeNBs 22, to the LTE cellular communication network 10 poses new problems not present in a conventional homogeneous cellular communication network. Like the eNBs 14, the HeNBs 22 use S1 connections to communicate with the core network 16 (not shown) and X2 connections to communicate with other HeNBs 22 and eNBs 14. In particular, there is a need for systems and methods that improve management of X2 communication between base stations and, in particular, between the eNB 14 and the HeNBs 22.

SUMMARY

The present disclosure relates to a base-station-to-base-station (BS-BS) gateway in a cellular communication network and methods of operation thereof. In one embodiment, the BS-BS gateway receives information from a first base station which includes a hostname and a network address of the first base station. The BS-BS gateway then stores a mapping between the hostname and the network address. Thereafter, in one embodiment, the BS-BS gateway enables a second base station to address messages to the first base station using the hostname of the first base station. In this manner, changes in the network address of the first base station will not affect the ability of the second base station to address messages to the first base station. In some embodiments, the first base station is a low-power base station (LP-BS) and the second base station is a high-power base station (HP-BS). As used herein "low-power base station" and "high-power base station" may be used to distinguish between base stations based on their permanent capabilities, current configuration, and/or their operation at a specific instant. Thus, in particular embodiments that include both low-power base stations and high-power base stations, a low-power base station may represent a device with comparable or identical components and capabilities to those of the high-power base stations but that is merely configured differently from, or operating in a different manner from, the high-power base stations at a given point in time.

In a further embodiment, the cellular communication network is a Long Term Evolution (LTE) cellular communication network and the BS-BS gateway is an X2 Gateway (X2-GW). Further, in one embodiment, the X2-GW receives the information including the hostname and network address via a Stream Control Transmission Protocol (SCTP) INIT message from the LP-BS (e.g., a Home Evolved/E-UTRAN Node B (HeNB)). In one embodiment, the hostname of the LP-BS is a Fully Qualified Domain Name (FQDN) determined from a Global eNB Identity of the LP-BS.

In one embodiment, a BS-BS gateway receives a connection initiation from a first base station to initiate a connection to a second base station. The BS-BS gateway then informs the first base station that the BS-BS gateway is a BS-BS gateway. Further, in one embodiment, the cellular communication network is an LTE cellular communication network and the BS-BS gateway is an X2-GW. Still further, in one embodiment, the first base station is an HP-BS, and the second base station is an LP-BS.

In one embodiment, a BS-BS gateway receives a message from a first base station where the destination is identified as a hostname of a second base station. The BS-BS gateway then obtains the network address of the second base station from a mapping between a hostname of the second base station and a network address of the second base station, and sends the message to the second base station using the network address of the second base station. Further, in one embodiment, the BS-BS gateway is an X2-GW. Still further, in one embodiment, the first base station is an HP-BS, and the second base station is an LP-BS.

In one embodiment, a base station determines its own hostname and network address. The base station then sends information including the hostname and network address to a BS-BS gateway. In one embodiment, the cellular communication network is an LTE cellular communication network, the BS-BS gateway is an X2-GW, and the base station sends the information including the hostname and network address of the base station to the X2-GW via an SCTP INIT message.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 16 is a block diagram of the X2-GW of FIG. 3 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to managing base-station-to-base-station (BS-BS) communication connections in a cellular communication network. While the embodiments described below are for a Long Term Evolution (LTE) cellular communication network, the present disclosure is not limited thereto. The concepts disclosed herein are applicable to any suitable type of cellular communication network. As such, while LTE terminology is sometimes used herein, such terminology should not be construed as limiting the scope of this disclosure. Additionally, as used herein, the term LTE encompasses both LTE and LTE Advanced.

Figure 1:
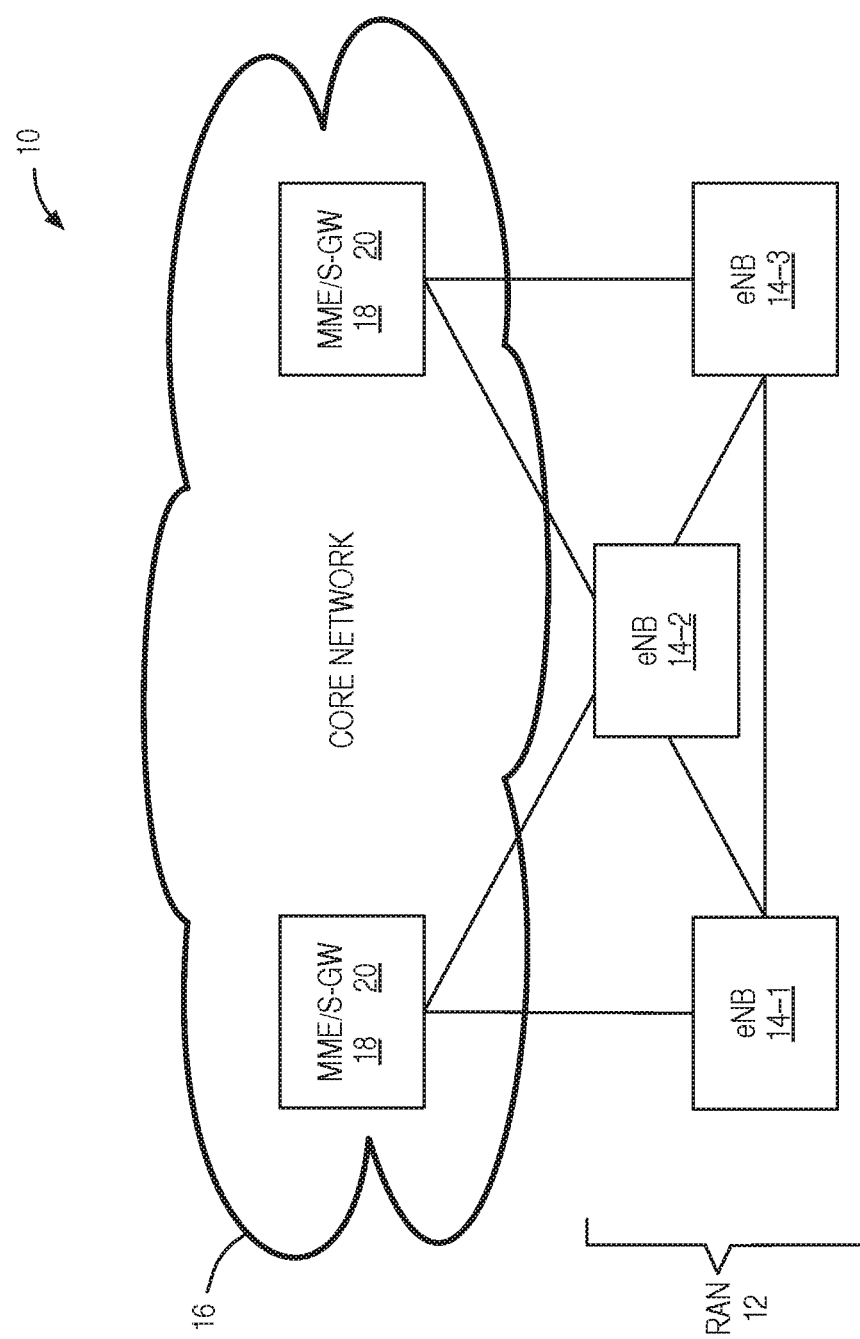
FIG. 1 illustrates a conventional Long Term Evolution (LTE) cellular communication network.
Figure 2:
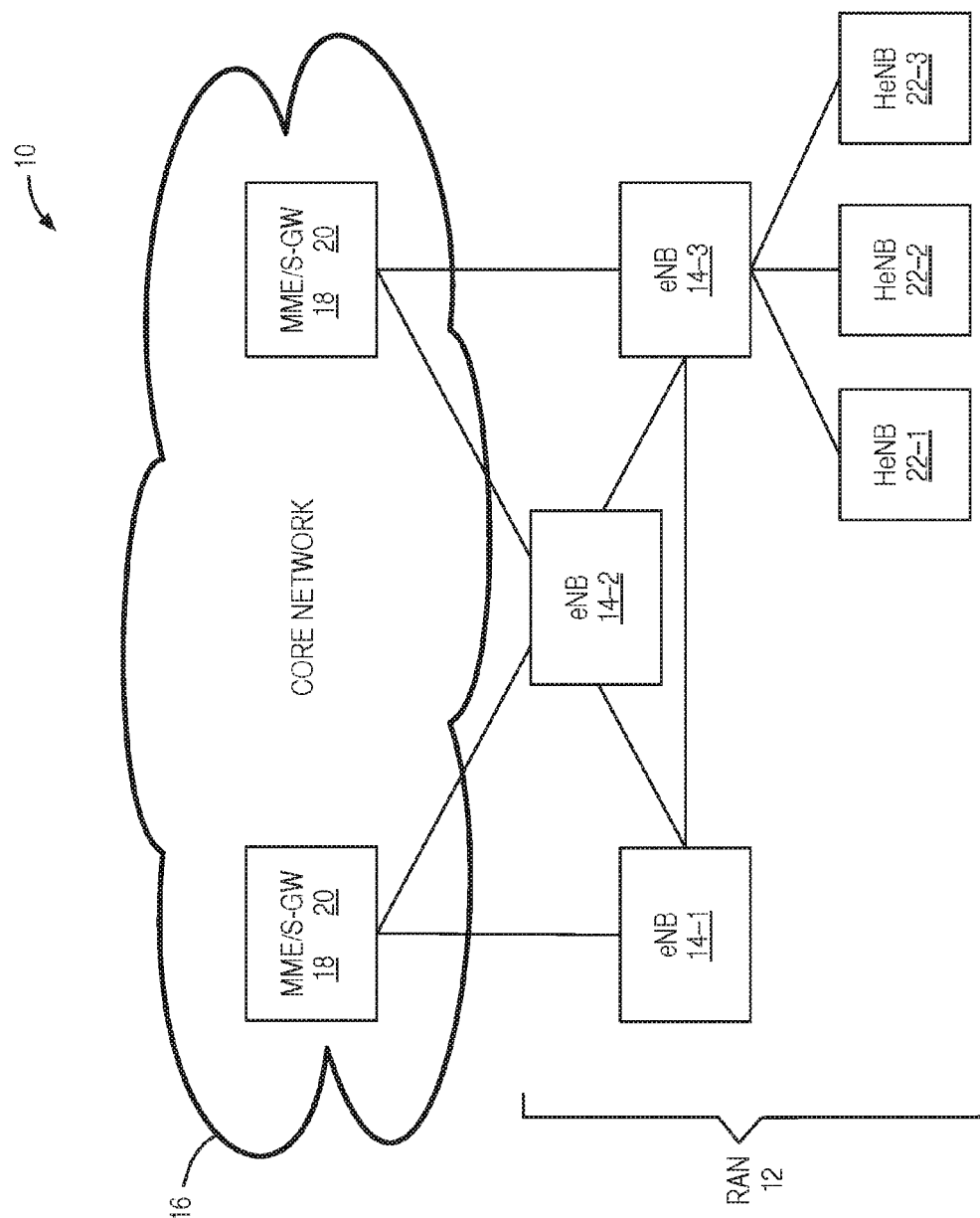
FIG. 2 illustrates a conventional heterogeneous LTE cellular communication network.

Before describing various embodiments of the present disclosure, a discussion of some particular issues related to X2 connection management in the heterogeneous deployment of a conventional LTE cellular communication network 10 illustrated in FIG. 2 is beneficial. As illustrated in FIG. 2, the heterogeneous deployment of the conventional LTE cellular communication network 10 includes Evolved/E-UTRAN Node Bs (eNBs) 14 as well as Home Evolved/E-UTRAN Node Bs (HeNBs) 22, which are used to extend the coverage area and increase the capacity of the conventional LTE cellular communication network 10. The addition of the HeNBs 22 to the conventional LTE cellular communication network 10 poses new problems not present in a conventional homogeneous cellular communication network.

One such problem results from additional X2 connections required for the HeNBs 22. As a result of the additional X2 connections, there is a significant increase in resources at the eNB 14 needed to manage the X2 connections. More specifically, for effective administration of a Radio Access Network (RAN) 12, it is desirable for each eNB 14 to have X2 connections with all of its neighbors, which in this case include both neighboring eNBs 14 and neighboring HeNBs 22. The increase in the number of X2 connections increases the amount of resources necessary for creating and maintaining these communication connections.

Another problem is that while most eNBs 14 are designed to be reliable and have high uptime, the HeNBs 22 may be powered down frequently. Power-down of the HeNBs 22 breaks the corresponding X2 connections to the neighboring eNBs 14 and the neighboring HeNBs 22. This can lead to additional resources being spent as the neighboring eNBs 14 and the neighboring HeNBs 22 attempt to reestablish the X2 connections, which can in turn impair the efficiency of the RAN 12. Furthermore, especially for the HeNBs 22, which may use a backhaul network that is not otherwise part of the LTE cellular communication network 10 (e.g., a home broadband connection), the network addresses, which are sometimes referred to as Transport Network Layer (TNL) addresses, may be different upon coming back online after power-down. This makes it more difficult for the neighboring eNBs 14 and the neighboring HeNBs 22 to reestablish the X2 connections after the HeNB 22 comes back online, which again impairs the efficiency of the RAN 12.

Figure 3:
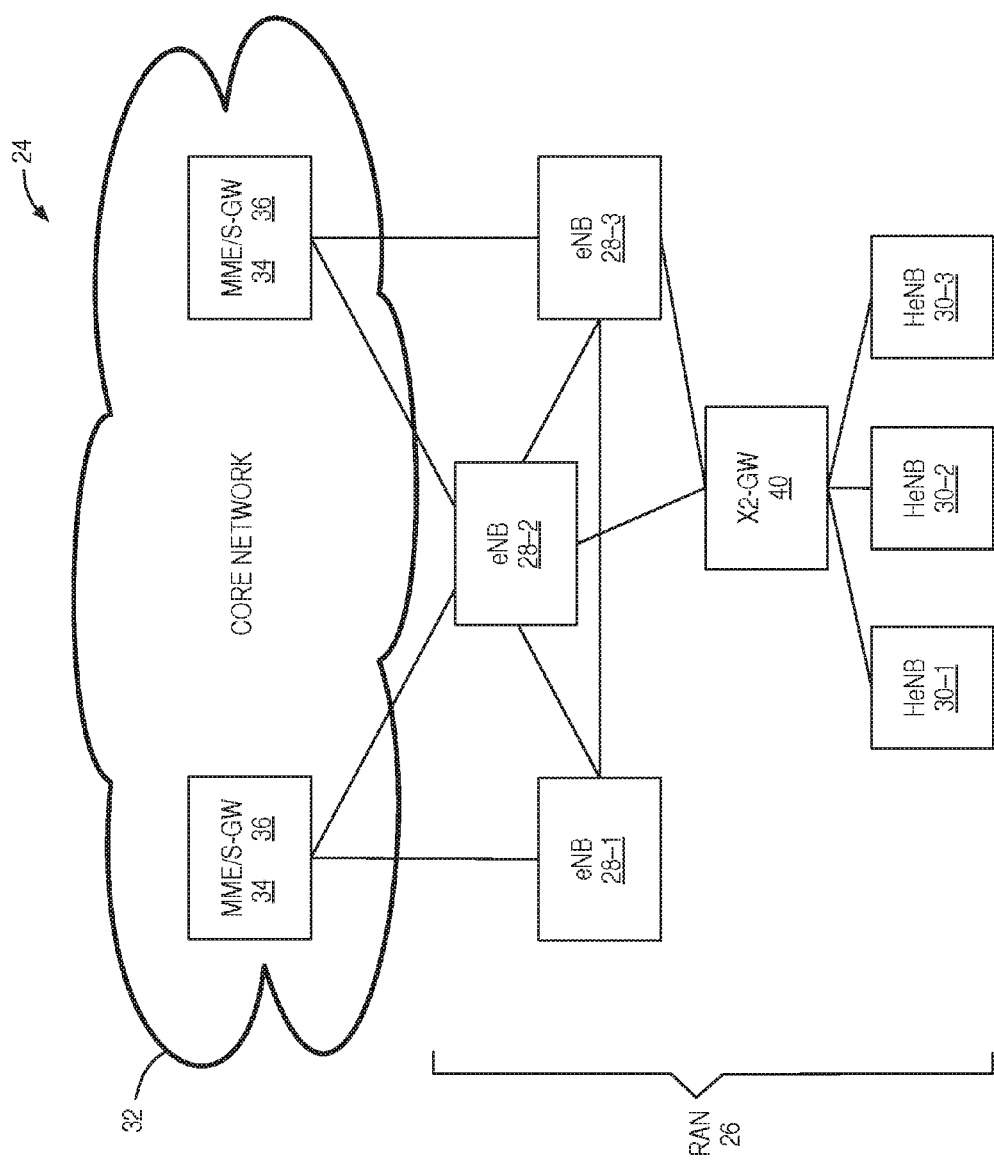
FIG. 3 illustrates a heterogeneous LTE cellular communication network including an X2 gateway (X2-GW) for X2 connections between Evolved/E-UTRAN Node Bs (eNBs) and Home Evolved/E-UTRAN Node Bs (HeNBs) according to one embodiment of the present disclosure.

Systems and methods that address the aforementioned issues in the conventional LTE cellular communication network 10 are disclosed herein. In this regard, FIG. 3 illustrates a heterogeneous LTE cellular communication network 24 according to one embodiment of the present disclosure. The heterogeneous LTE cellular communication network 24 includes a RAN 26, which includes eNBs 28-1 through 28-3 (generally referred to herein collectively as eNBs 28 and individually as eNB 28) that provide wireless radio access for one or more wireless devices, which for LTE are referred to as user equipment devices (UEs) (not shown). The RAN 26 also includes HeNBs 30-1 through 30-3 (generally referred to herein collectively as HeNBs 30 and individually as HeNB 30) that also provide wireless radio access to one or more UEs. It is important to remember that the HeNBs 30 are used only as an example of the concepts disclosed herein, but the concepts disclosed herein are equally applicable to any type(s) of low-power base stations (LP-BSs) (e.g., LP-BSs for femtocells, picocells, microcells, or the like). These LP-BSs generally serve a smaller area than high-power base stations (HP-BSs) such as the eNBs 28. For example, some LP-BSs, such as HeNBs 30, are deployed in individual residences or small businesses.

The eNBs 28 and the HeNBs 30 communicate with each other via X2 connections. Note that while many of the embodiments disclosed herein focus on BS-BS communication (e.g., X2 communication) between HP-BSs and LP-BSs, the concepts disclosed herein are also applicable to BS-BS communication between base stations of the same type (e.g., between two HP-BSs or between two LP-BSs). BS-BS communication over X2 connections is used to, for example, coordinate connection handovers and perform load management between the eNBs 28 and the HeNBs 30. In LTE, these BS-BS communications (which for LTE are also referred to herein as X2 communications) are sent over an Internet Protocol (IP) network using Stream Control Transmission Protocol (SCTP) as the transport layer for control messages.

The eNBs 28 communicate with a core network 32 of the heterogeneous LTE cellular communication network 24 via corresponding S1 connections. Likewise, while not illustrated, the HeNBs 30 also communicate with the core network 32 via corresponding S1 connections. In LTE, S1 control messages are also sent over an IP network using SCTP as the transport layer. The core network 32 includes one or more Mobility Management Entities (MMEs) 34 and one or more Serving Gateways (S-GWs) 36. The MMEs 34 are control nodes for the heterogeneous LTE cellular communication network 24 that are responsible for, among other things, tracking UEs as the UEs move through the heterogeneous LTE cellular communication network 24. The MMEs 34 are also responsible for assigning the UEs to the S-GWs 36. The S-GWs 36 operate to, among other things, route and forward user data packets, while also acting as mobility anchors for the user plane during inter-base-state handovers and as anchors for mobility between LTE and other 3$^{rd}$ Generation Partnership Project (3GPP) technologies.

The heterogeneous LTE cellular communication network 24 also includes an X2 Gateway (X2-GW) 40 for X2 connections between the eNBs 28 and the HeNBs 30. In this particular example, the X2 connections between the eNB 28-2 and the HeNBs 30 are provided via the X2-GW 40. Likewise, the X2 connections between the eNB 28-3 and the HeNBs 30 are provided via the X2-GW 40. For security reasons, traffic over the X2 connections will preferably be encrypted using IP Security (IPsec) tunnels which authenticate and encrypt every IP packet. If the X2-GW 40 is considered to be located at a trusted site, it may have one IPsec tunnel between the eNB 28-2 and X2-GW 40, for instance, and one IPsec tunnel between the X2-GW 40 and each HeNB 30-1 through 30-3. This means that the X2-GW 40 can interact with the IP packets in order to decrypt and re-encrypt the packets as needed, according to one embodiment. The X2-GW 40 is beneficial for the eNBs 28-2 and 28-3 because each of the eNBs 28-2 and 28-3 maintains only one SCTP transport layer connection to the X2-GW 40 instead of separate SCTP transport layer connections for each X2 connection for each of the HeNBs 30.

As discussed below in detail, in one embodiment, the X2-GW 40 creates mappings between hostnames and network addresses for the HeNBs 30. However, it should be noted that the X2-GW 40 may additionally or alternatively be used to create mappings between hostnames and network addresses for the eNBs 28. Using the mappings, the X2-GW 40 is enabled to route X2 messages addressed with the hostnames of the HeNBs 30 from the eNBs 28-2 and 28-3 to the appropriate HeNBs 30. Among other things, this may allow for faster X2 connection reestablishment between eNBs 28 and HeNBs 30 when the network address of any of the eNBs 28 or HeNBs 30 changes for any reason, including if an eNB 28 or an HeNB 30 is assigned a different network address upon coming back online after power-down. This is only a benefit of one preferred embodiment and does not limit the present disclosure thereto.

In addition to routing messages addressed with hostnames, the X2-GW 40 enables the eNBs 28 and/or the HeNBs 30 to query the X2-GW 40 for the network address of a desired HeNB 30 based on the hostname of the desired HeNB 30. Specifically, an eNB 28 or HeNB 30 can query the X2-GW 40 with a hostname. The X2-GW 40 then looks up the corresponding network address and returns the network address to the eNB 28 or the HeNB 30 that issued the query.

Notably, the X2-GW 40 is not limited to the functions described above. For instance, as discussed below in detail, in one embodiment, the X2-GW 40 can also notify the eNBs 28 and/or HeNBs 30 that an eNB 28 or HeNB 30 to which they are connected through X2 connections is unavailable. This reduces the resources being spent attempting to reestablish the X2 connections with the eNB 28 or HeNB 30 that is unavailable.

Before further discussing embodiments of the present disclosure, a brief review of the SCTP protocol used for the X2 connections is beneficial. SCTP is defined in Request for Comments (RFC) 4960. SCTP is designed for signaling transport over IP networks. SCTP is connection-oriented and provides signaling means between endpoints. An SCTP packet is made of two parts: (1) a common header containing source and destination information and (2) one or more chunks. A chunk includes either control information or user data. While not essential for understanding the concepts disclosed and claimed herein, for more information regarding SCTP, the interested reader is directed to RFC 4960, "Stream Control Transmission Protocol," published in September 2007.

Figure 4:
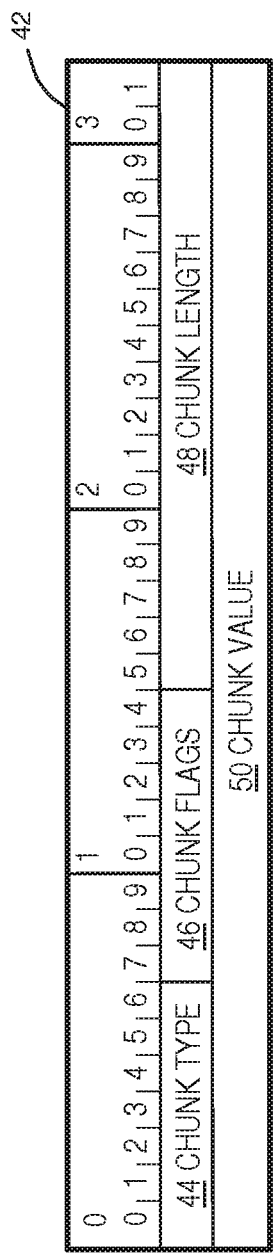
FIG. 4 illustrates a field format for chunks transmitted in a Stream Control Transmission Protocol (SCTP) packet.

FIG. 4 illustrates the field format for an SCTP chunk 42 within an SCTP packet. The SCTP chunk 42 comprises a Chunk Type field 44, a Chunk Flags field 46, a Chunk Length field 48, and a Chunk Value field 50. The Chunk Type field 44 includes a chunk type of the SCTP chunk 42, where the chunk type identifies the type of information contained in the Chunk Value field 50 and takes a value of between 0 and 254. The value of 255 is reserved for future use as an extension field. RFC 4960 defines the chunk types illustrated in Table 1 below.

TABLE 1

| ID Value | Chunk Type |
|---|---|
| 0 | Payload Data (DATA) |
| 1 | Initiation (INIT) |
| 2 | Initiation Acknowledgement (INIT ACK) |
| 3 | Selective Acknowledgement (SACK) |
| 4 | Heartbeat Request (HEARTBEAT) |
| 5 | Heartbeat Acknowledgement (HEARTBEAT ACK) |
| 6 | Abort (ABORT) |
| 7 | Shutdown (SHUTDOWN) |
| 8 | Shutdown Acknowledgement (SHUTDOWN ACK) |
| 9 | Operation Error (ERROR) |
| 10 | State Cookie (COOKIE ECHO) |
| 11 | Cookie Acknowledgement (COOKIE ACK) |
| 12 | Reserved for Explicit Congestion Notification Echo (ECNE) |
| 13 | Reserved for Congestion Window Reduced (CWR) |
| 14 | Shutdown Complete (SHUTDOWN COMPLETE) |

An SCTP packet including a chunk of INIT chunk type is used to establish a connection between two endpoints. The INIT chunk contains some mandatory fields as well as some variable fields. The variable fields are given below in Table 2.

TABLE 2

| Variable Parameter | Status | Type Value |
|---|---|---|
| IPv4 Address | Optional | 5 |
| IPv6 Address | Optional | 6 |
| Cookie Preservative | Optional | 9 |
| Reserved for ECN Capable | Optional | 32768 (0x8000) |
| Host Name Address | Optional | 11 |
| Supported Address Types | Optional | 12 |

In more detail, the IPv4 Address field is 32 bits (unsigned integer) and contains an IPv4 address of the sending endpoint. It is binary encoded. An IPv4 Address parameter indicates a network address the sending endpoint of the INIT chunk will support for the connection being initiated. The IPv6 Address field is 128 bits (unsigned integer) and contains an IPv6 (RFC2460) address of the sending endpoint. It is binary encoded. An IPv6 Address parameter indicates a network address the sending endpoint of the INIT chunk will support for the connection being initiated. The Host Name Address field can be used by the sending endpoint of INIT chunk to pass its hostname (in place of its IP addresses) to the recipient endpoint. The recipient endpoint is responsible for resolving the hostname.

The INIT ACK chunk type is used to acknowledge the initiation of an SCTP connection (i.e., an SCTP association). The ABORT chunk type is used to immediately close, or terminate, the connection. The ABORT chunk may contain Cause Parameters to inform the recipient endpoint about the reason for the abort. A description of the causes is given below with respect to the ERROR chunk type. The SHUTDOWN chunk type is sent to initiate a graceful close of the connection with the recipient endpoint. In contrast to the ABORT chunk type, the SHUTDOWN chunk type allows any buffers to be emptied and other control messages to be processed while the connection is terminated.

The ERROR chunk type is used to notify the sending endpoint's peer (i.e., the recipient endpoint) of certain error conditions. An ERROR chunk contains one or more causes. An ERROR chunk is not considered fatal to the connection in and of itself, but may be used with an ABORT chunk to report a fatal condition. The Cause Code of an ERROR chunk defines the type of error condition being reported. Defined Cause Codes are given in Table 3 below.

TABLE 3

| Cause Code Value | Cause Code |
|---|---|
| 1 | Invalid Stream Identifier |
| 2 | Missing Mandatory Parameter |
| 3 | Stale Cookie Error |
| 4 | Out of Resource |
| 5 | Unresolvable Address |
| 6 | Unrecognized Chunk Type |
| 7 | Invalid Mandatory Parameter |
| 8 | Unrecognized Parameters |
| 9 | No User Data |
| 10 | Cookie Received While Shutting Down |
| 11 | Restart of an Association with New Addresses |
| 12 | User Initiated Abort |
| 13 | Protocol Violation |

Figure 5:
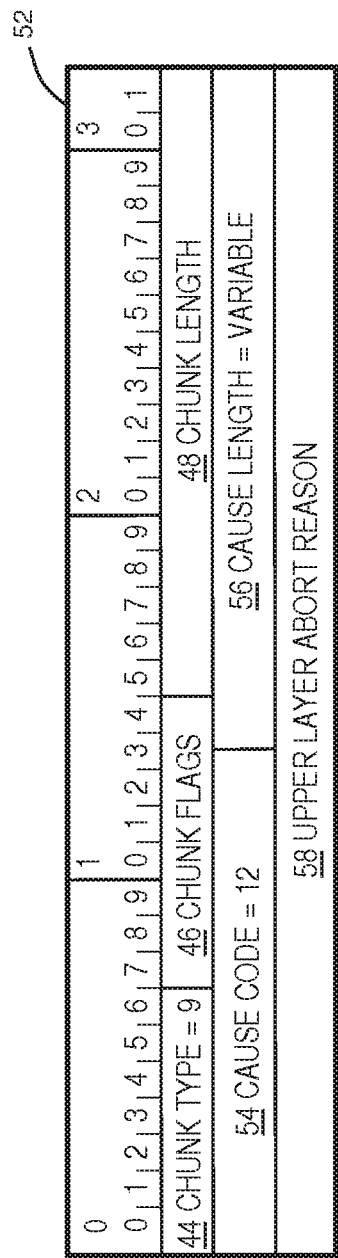
FIG. 5 illustrates a chunk transmitted in an SCTP packet wherein the Chunk Type is set to ERROR and the Cause Code is set to User Initiated Abort.

FIG. 5 illustrates one instance of the SCTP chunk 42, where the SCTP chunk 42 is more specifically an ERROR chunk 52. As illustrated, the Chunk Value field 50 includes a Cause Code field 54, a Cause Length field 56, and an Upper Layer Abort Reason field 58. In this particular example, the Cause Code field 54 is set to "12," which is a User Initiated Abort. The User Initiated Abort Cause Code indicates that the ERROR chunk 52 was sent because of an upper-layer request. The upper layer can specify an Upper Layer Abort Reason that is transported transparently by SCTP in the Upper Layer Abort Reason field 58. The Upper Layer Abort Reason may be delivered to the upper layer at the recipient endpoint.

Figure 6:
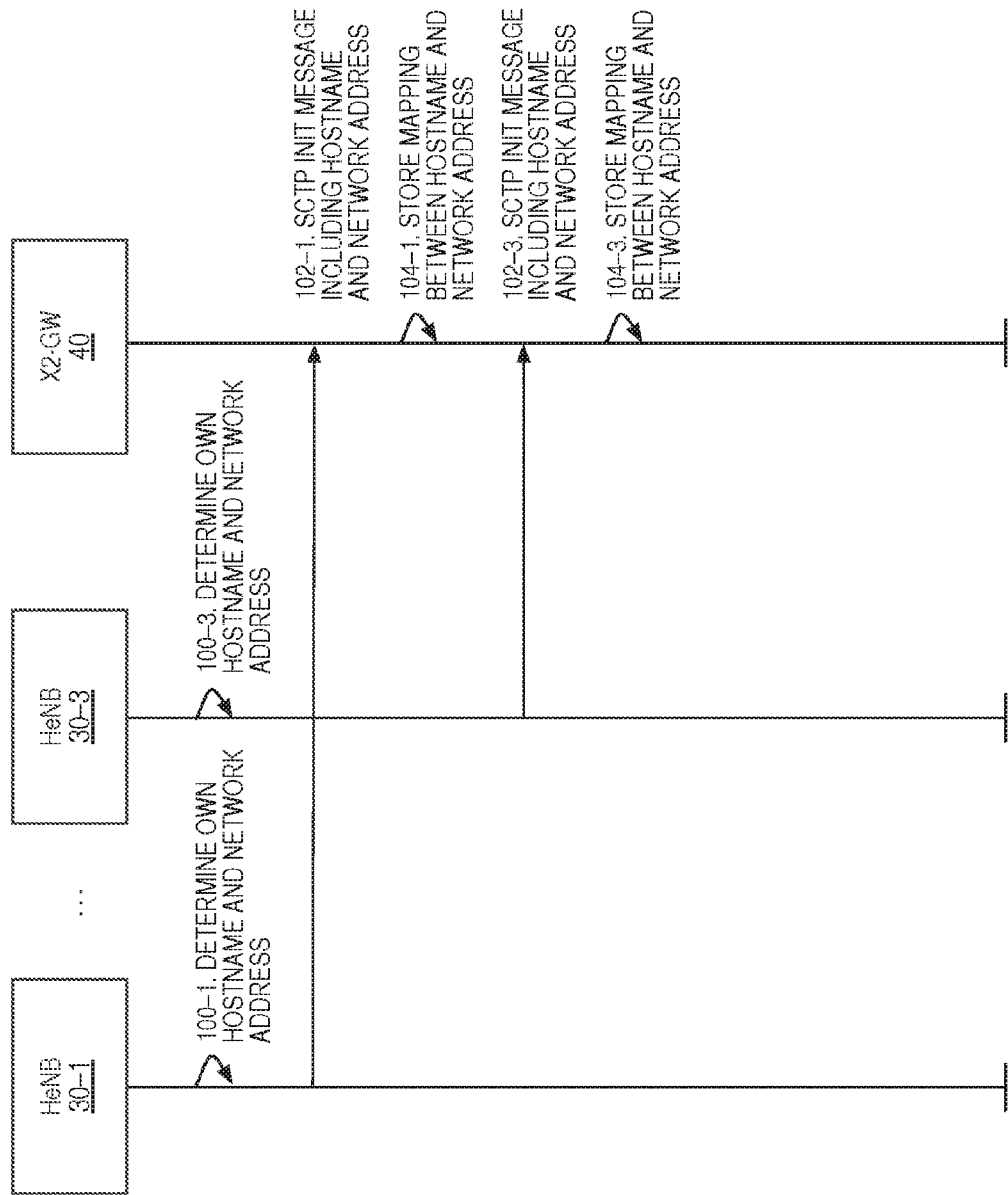
FIG. 6 illustrates the operation of the heterogeneous LTE cellular communication network of FIG. 3 where the X2-GW obtains mappings of hostnames to network addresses of the HeNBs according to one embodiment of the present disclosure.
Figure 7A:
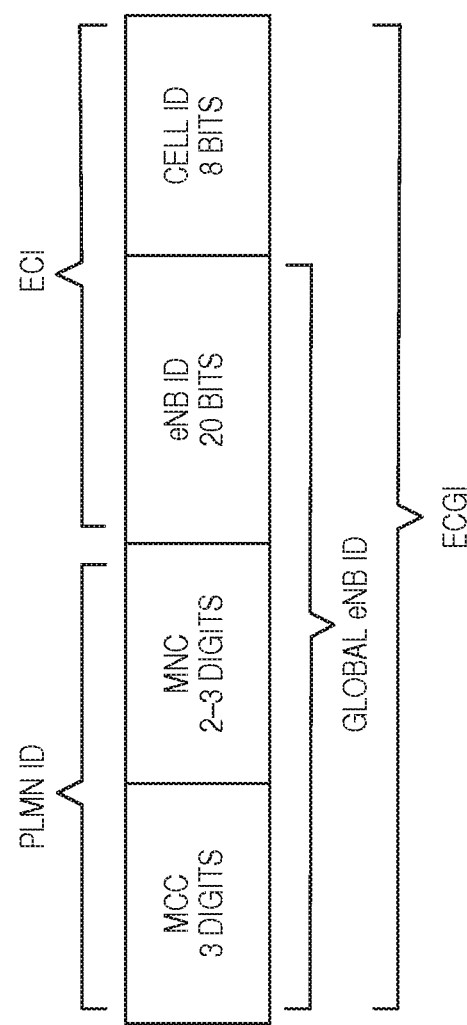
FIG. 7A illustrates the composition of an Evolved Universal Terrestrial Radio Access Network (E-UTRAN) Cell Global Identifier (ECGI), an E-UTRAN Cell Identifier (ECI), and a Public Land Mobile Network (PLMN) ID, which are utilized to create hostnames according to one embodiment of the present disclosure.
Figure 7B:
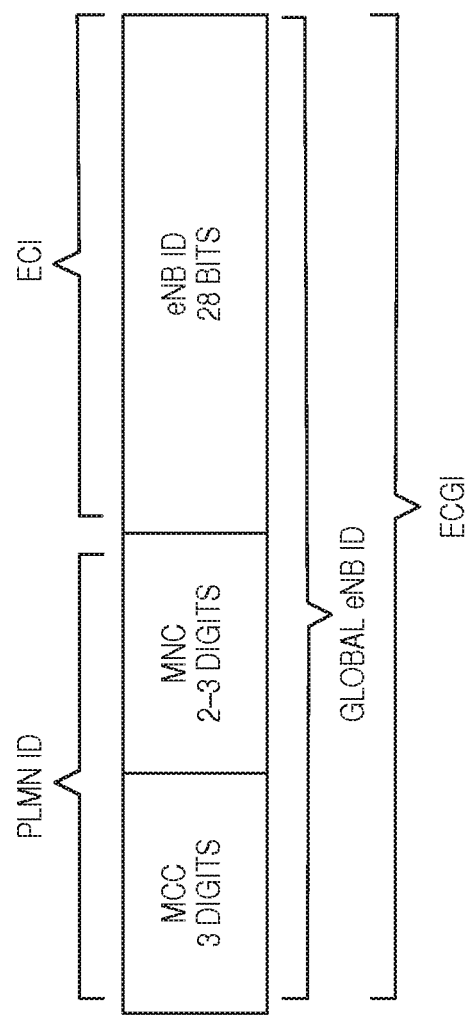
FIG. 7B illustrates the composition of an ECGI, an ECI (where the ECI is the eNB ID), and a PLMN ID, which are utilized to create hostnames according to one embodiment of the present disclosure.

FIG. 6 illustrates the operation of the heterogeneous LTE cellular communication network 24 of FIG. 3 where the X2-GW 40 obtains mappings of hostnames to network addresses of the HeNBs 30 according to one embodiment of the present disclosure. The HeNBs 30-1 through 30-3 first determine their own hostnames and network addresses (steps 100-1 through 100-3). The network address of the HeNB 30 is, in one embodiment, an IP address of the HeNB 30, which can be obtained or otherwise determined by the HeNB 30 using any suitable technique. In one embodiment, the hostname of the HeNB 30 is a Fully Qualified Domain Name (FQDN) of the HeNB 30, which, in one embodiment, can be determined by the HeNB 30 using an Evolved Universal Terrestrial Radio Access Network (E-UTRAN) Cell Global Identifier (ECGI) of the HeNB 30. More specifically, FIGS. 7A and 7B illustrate components of an ECGI. The ECGI is a concatenation of a Public Land Mobile Network (PLMN) ID and an E-UTRAN Cell Identifier (ECI). Furthermore, the PLMN is a concatenation of a Mobile Country Code (MCC) that identifies the country where the mobile network is located and a Mobile Network Code (MNC) that identifies the network operator. Additionally, the ECI, as shown in FIG. 7A, is a concatenation of an eNB ID (20 bits) which uniquely identifies a base station in a mobile network and a Cell ID (8 bits) which identifies a specific cell served by the base station. In the case of an HeNB 30 and some other LP-BSs, the base station has only one cell, such that all the digits of the ECI (28 bits) are devoted to unique base station identification, as shown in FIG. 7B.

Returning to FIG. 6, according to one embodiment, the HeNB 30 determines the FQDN of the HeNB 30 based on the following string:

henbID<ENBID>.mnc<MNC>.mcc<MCC>.3gppnetwork.org where <ENBID>, <MNC>, and <MCC> are replaced with the values of the ENBID, MNC, and MCC of the HeNB 30. The FQDN is then used as the hostname of the HeNB 30. In other embodiments, combinations of values such as Tracking Area Code (TAC), Tracking Area Identity (TAI), and Closed Subscriber Group (CSG) ID are used to create a hostname. Note that this is just one embodiment. The FQDN may be determined using any suitable formula or means. Further, the hostname is not limited to an FQDN of the HeNB 30. Any type of suitable hostname may be used.

The HeNBs 30-1 through 30-3 then send SCTP INIT messages, including both the hostnames and the network addresses of the HeNBs 30-1 through 30-3, to the X2-GW 40 (steps 102-1 through 102-3). In one embodiment, in order to determine the network address of the X2-GW 40, the HeNBs 30 determine the FQDN of the X2-GW 40 based on the following string: x2gw.tac-lb<TAC-low-byte>.tac-hb<TAC-high-byte>.mnc<MNC>.mcc<MCC>.3gppnetwork.org. The HeNBs 30 then query a Domain Name System (DNS) server using the FQDN to obtain the network address of the X2-GW 40. More specifically, using the HeNB 30-1 as an example, the HeNB 30-1 sends an SCTP message including an INIT chunk (this SCTP message is referred to herein as an SCTP INIT message) to the X2-GW 40, where the INIT chunk includes the hostname of the HeNB 30-1 in the corresponding parameter field of the INIT chunk. The network address of the HeNB 30-1 can also be included in the corresponding parameter field of the INIT chunk or, alternatively, may be determined by, for example, the sender address in the IP packet header. In this manner, the HeNBs 30 sends information to the X2-GW 40 including the hostnames and the network addresses of the HeNBs 30 via SCTP INIT messages according to one embodiment of the present disclosure. Note that the SCTP INIT messages are just one preferred embodiment. The HeNBs 30 may send the information including the hostnames and network addresses to the X2-GW 40 using any suitable message or message type.

Upon receiving the SCTP INIT messages from the HeNBs 30-1 through 30-3, the X2-GW 40 stores corresponding mappings between the hostnames and the network addresses of the HeNBs 30 (steps 104-1 through 104-3). In this way, the X2-GW 40 creates mappings between hostnames and network addresses for the HeNBs 30. According to one embodiment of the present disclosure, new mappings are established as new HeNBs 30 are brought online or initiate X2 connections with the X2-GW 40. Further, in one embodiment, the mappings may also be updated as the HeNBs 30 change their network addresses and/or hostnames.

Figure 8:
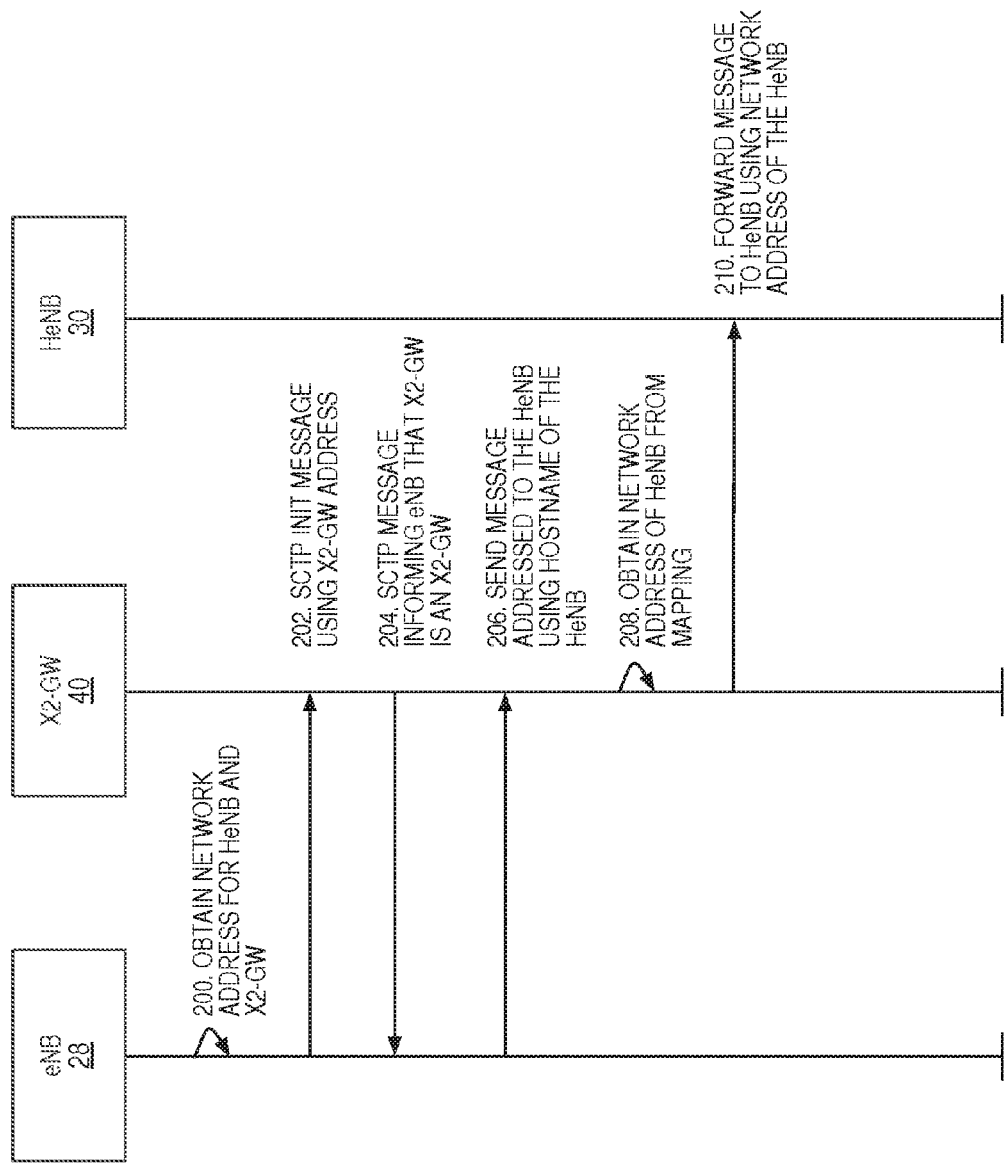
FIG. 8 illustrates the operation of the X2-GW of FIG. 3 to enable addressing of X2 messages between the eNBs and the HeNBs using the hostnames of the HeNBs according to one embodiment of the present disclosure.

FIG. 8 illustrates the operation of the X2-GW 40 of FIG. 3 where the X2-GW 40 enables addressing of X2 messages between the eNBs 28 and the HeNBs 30 using the hostnames of the HeNBs 30, according to one embodiment of the present disclosure. An eNB 28 first obtains a network address for an HeNB 30 and a network address for the X2-GW 40 associated with the HeNB 30 (step 200). According to one embodiment of the present disclosure, step 200 is the Automatic Neighbor Relation (ANR) and TNL address discovery process of FIG. 9 (described below), but the present disclosure is not limited thereto. Next, the eNB 28 initiates an X2 connection by sending an SCTP INIT message to the X2-GW 40 (step 202). Notably, at the time of initiating the X2 connection, in this embodiment, the eNB 28 does not know that the X2-GW 40 is in fact an X2-GW. Rather, the eNB 28 may only be aware that the network address obtained for the X2-GW 40 is a network address of a gateway such as a Security Gateway (SeGW). In some embodiments, the functionality of the X2-GW 40 and the SeGW can be combined into a single gateway. In other embodiments, the X2-GW 40 and the SeGW can be implemented separately. This transparency enables the procedures of the eNB 28 to be unaffected by the presence of the X2-GW 40. If the eNB 28 does not know how to take advantage of the features of the X2-GW 40, the legacy procedures will still be operational. This is only a benefit of one preferred embodiment, and does not limit the present disclosure thereto.

The X2-GW 40 then sends an SCTP message back to the eNB 28 informing the eNB 28 that the X2-GW 40 is an X2-GW 40 (step 204). In one embodiment, this SCTP message is an SCTP ERROR message (i.e., an SCTP message including an ERROR chunk) that includes the User Initiated Abort Cause Code along with an Upper Layer Abort Reason that indicates that the X2-GW 40 is an X2-GW. By informing the eNB 28 that the X2-GW 40 is an X2-GW, the eNB 28 is enabled to take advantage of the functionality of the X2-GW 40 (e.g., send X2 messages through the X2-GW 40 addressed via appropriate hostnames).

In this embodiment, the eNB 28 then sends a message addressed to the HeNB 30 using the hostname of the HeNB 30 (step 206). The X2-GW 40 obtains the network address of the HeNB 30 from the mapping between the hostname and the network address of the HeNB 30 (step 208). In this manner, the X2-GW 40 translates, or resolves, the hostname of the HeNB 30 to the network address of the HeNB 30. The X2-GW 40 then forwards the message to the HeNB 30 using the network address of the HeNB 30 (step 210). Enabling the eNB 28 to address messages to the HeNB 30 using the hostname of the HeNB 30 in this manner provides many advantages. While not being limited to or by any particular advantage, as one example, changes in the network address of the HeNB 30 will not affect the ability of the eNB 28 to address messages to the HeNB 30. This is useful, for example, because HeNBs 30 are more likely to use a backhaul network that is not otherwise part of the LTE cellular communication network 10 (e.g., a home broadband connection) and the network address of the HeNB 30 may change. Enabling the eNB 28 to address messages to the HeNB 30 using the hostname of the HeNB 30 reduces the time and resources required to reestablish a connection between the eNB 28 and the HeNB 30, since the eNB 28 will not be required to query via the MME 34 or some other core network 32 element to determine the new network address of the HeNB 30.

Figure 9:
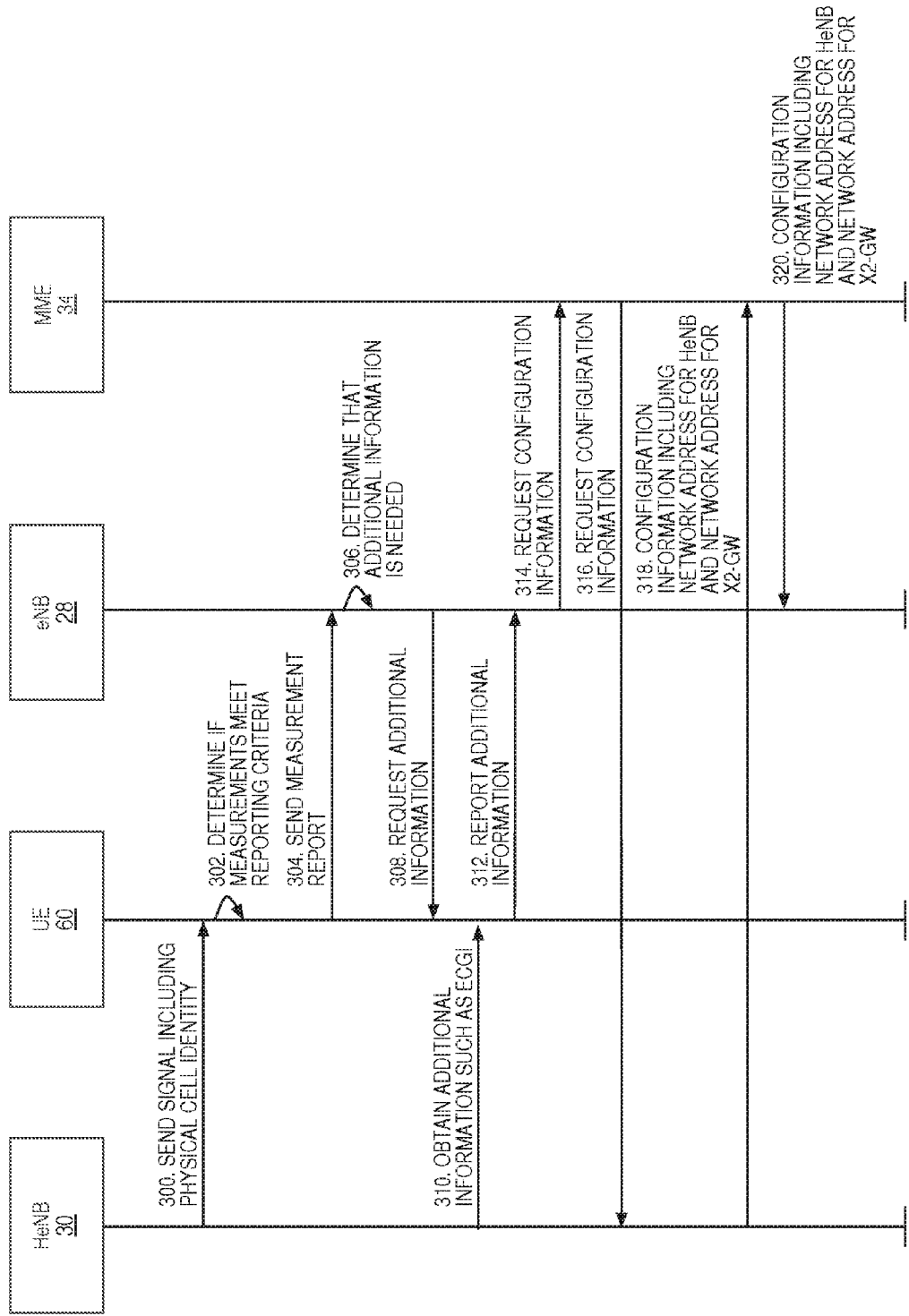
FIG. 9 illustrates a process by which an eNB of FIG. 3 receives configuration information about an HeNB via an Automated Neighbor Relation (ANR) and Transport Network Layer (TNL) address discovery process that enables the eNB to establish an X2 connection to the HeNB via the X2-GW according to one embodiment of the present disclosure.

FIG. 9 illustrates a process by which an eNB 28 of FIG. 3 receives configuration information about an HeNB 30 via an ANR and TNL address discovery process, where the configuration information enables the eNB 28 to establish an X2 connection to the HeNB 30 via the X2-GW 40 according to one embodiment of the present disclosure. A UE 60 first detects a Physical Cell ID (PCI) of the HeNB 30 (step 300).

The UE 60 then determines if signal measurements for the HeNB 30 meet one or more predefined reporting criteria (step 302). The reporting criteria can include signal strength according to one embodiment of the present disclosure. If the reporting criteria have been met, the UE 60 sends a measurement report to the eNB 28 with which the UE 60 is already associated (step 304).

The eNB 28 analyzes the measurement report to determine if the measurement report is associated with a source that is unknown to the eNB 28 and is a candidate to become a neighbor. This process is one of many adopted by 3GPP and implemented in the standards of LTE that work toward a planned Self Organizing Network (SON). If the eNB 28 determines that additional information about the HeNB 30 is needed (step 306), the eNB 28 requests additional information about the HeNB 30 from the UE 60 (step 308). The additional information requested by the eNB 28 may include one or more desired or relevant parts of system information broadcast by the HeNB 30. As an example, the eNB 28 may request the ECGI of the HeNB 30. The UE then obtains the additional information from the HeNB 30 (step 310) and reports the additional information to the eNB 28 (step 312).

The eNB 28 then uses this information, such as the ECGI of the HeNB 30, to query via an MME 34, or other element of the core network 32, requesting configuration information for the HeNB 30 (step 314). The MME 34 then queries the HeNB 30 requesting configuration information for the HeNB 30 (step 316). The HeNB 30 then sends the configuration information for the HeNB 30 to the MME 34 that includes the network address for the HeNB 30 and the network address for the X2-GW 40 associated with the HeNB 30 (step 318). The MME 34 sends the configuration information for the HeNB 30 to the eNB 28 that includes the network address for the HeNB 30 and the network address for the X2-GW 40 associated with the HeNB 30 (step 320). In one embodiment, the X2-GW 40 is not identified as such in the configuration information. Also, in one embodiment, the network addresses are IP addresses; however, the present disclosure is not limited thereto.

While the eNBs 28 are designed to be reliable and have high uptime, there may still be times when the eNBs 28 are not available. This could be due to unforeseen circumstances or scheduled maintenance, for example. Due to the possible modularity and more personal aspect of HeNBs, in some embodiments, the HeNBs 30 may be powered down more frequently than the eNBs 28, or may otherwise become unavailable. This unavailability of an eNB 28 or an HeNB 30 can have a negative impact on the efficiency of the RAN 26, among other things. According to one embodiment, when the eNB 28 or the HeNB 30 determines that the eNB 28 or the HeNB 30 is transitioning to an unavailable state, the eNB 28 or the HeNB 30 notifies one or more radio network nodes of the unavailability of the eNB 28 or the HeNB 30. As used herein, radio network nodes may refer to base stations (such as eNBs 28 and HeNBs 30), BS-BS gateways (such as an X2-GW 40), or any other node in the radio access network. This notification will, among other things, reduce the attempts to reestablish an X2 connection between the eNBs 28 or the HeNBs 30 (or the X2-GW 40) and the now unavailable eNB 28 or HeNB 30. This is only a benefit of one preferred embodiment, and does not limit the present disclosure thereto.

Figure 10A:
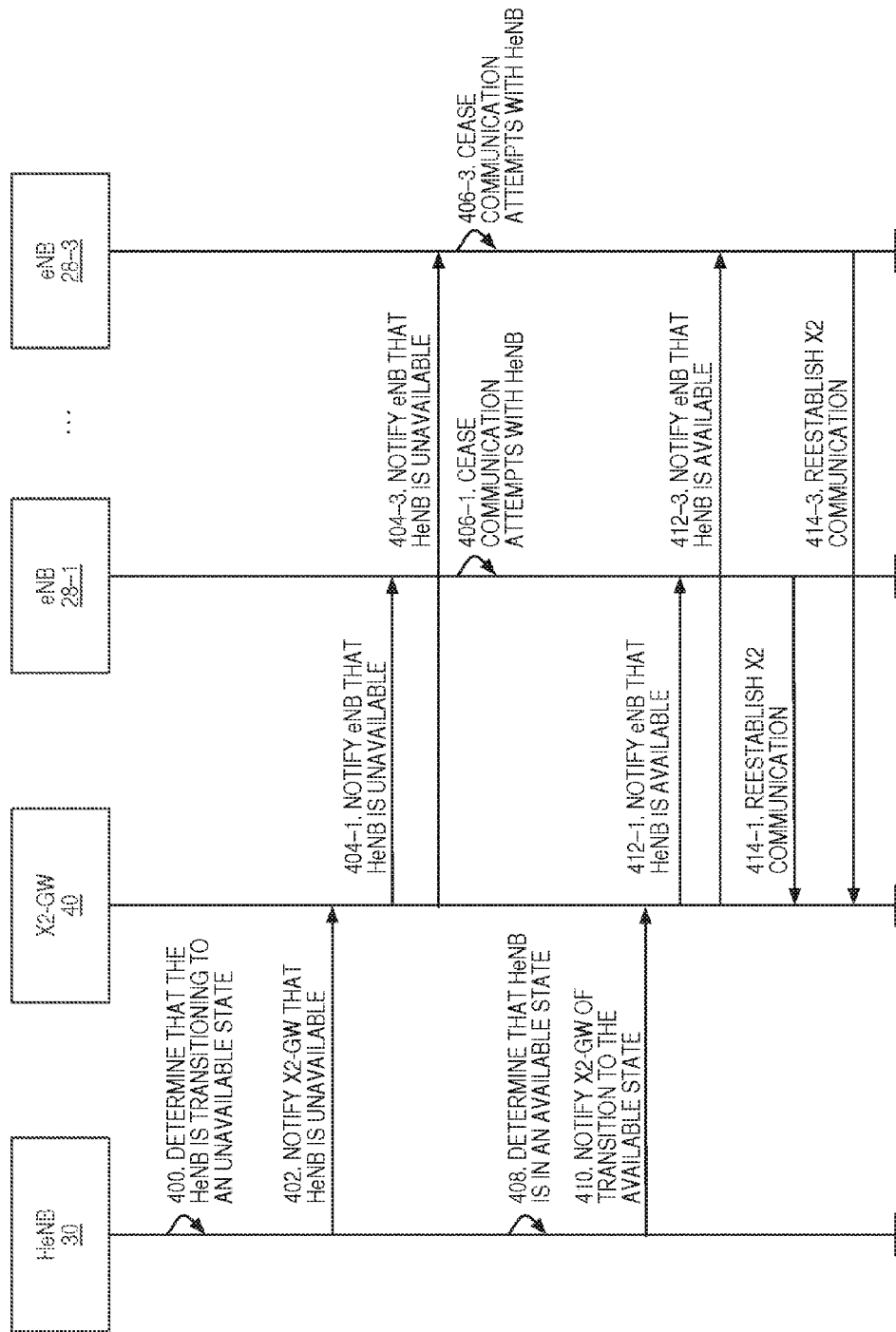
FIGS. 10A and 10B illustrate the operation of the heterogeneous LTE cellular communication network of FIG. 3, where an HeNB indirectly notifies one or more eNBs that the HeNB is unavailable via the X2-GW according to one embodiment of the present disclosure.
Figure 10B:
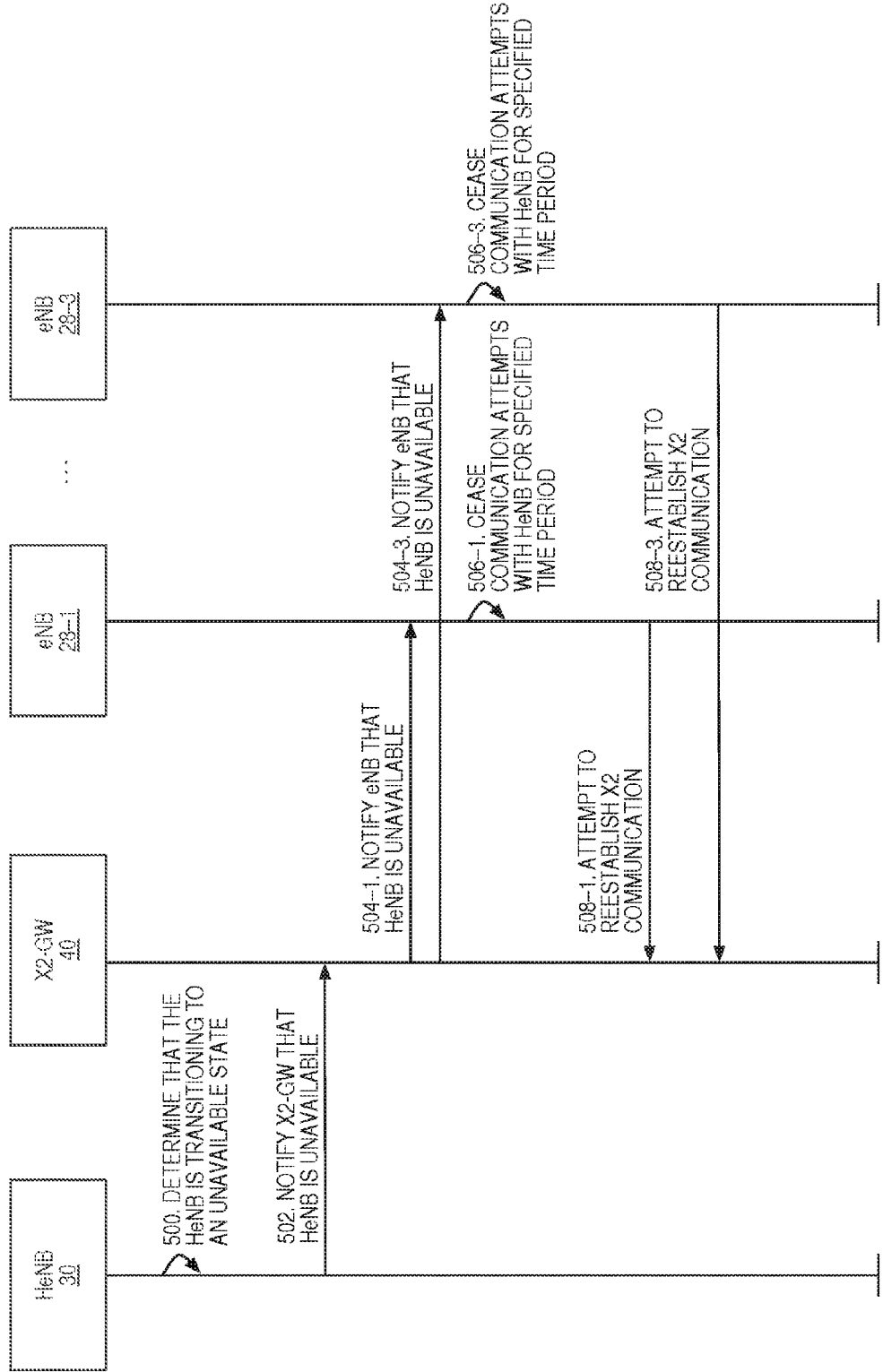

In this regard, FIGS. 10A and 10B illustrate the operation of the heterogeneous LTE cellular communication network 24 of FIG. 3 where an HeNB 30 indirectly notifies one or more eNBs 28 that the HeNB 30 is unavailable via the X2-GW 40, according to one embodiment of the present disclosure. FIG. 10A illustrates a scenario where the eNB 28 ceases communication attempts with the HeNB 30 until the eNB 28 is notified that the HeNB 30 is available. Conversely, FIG. 10B illustrates a scenario where the eNB 28 ceases communication attempts with the HeNB 30 for a specific period of time. In another embodiment, the eNB 28 ceases communication attempts with the HeNB 30 until the eNB 28 receives information from a UE indicating that the HeNB 30 is available. This might occur, for instance, as part of an ANR process as described with regard to FIG. 9.

In FIG. 10A, first the HeNB 30 determines that it is transitioning to an unavailable state (step 400). This determination can be in response to the HeNB 30 being powered down or otherwise transitioning to unavailability. Next, the HeNB 30 notifies the X2-GW 40 that the HeNB 30 is unavailable (step 402). In one embodiment, this notification is accomplished by sending an SCTP message over an X2 connection. More specifically, the message could be an SCTP message with a SHUTDOWN chunk or an ERROR chunk with a predefined reason in the Upper Layer Abort Reason field 58 that indicates that the HeNB 30 is unavailable. This message could, for example, encode that the HeNB 30 is powering down, or even that the HeNB 30 is an HeNB and that it is powering down. Note that the SCTP message is just one preferred embodiment and that the notification can be accomplished using any suitable means. This notification is similar to the deactivation message that the eNBs 28 are enabled to send when disabling cells for energy savings. Currently, it is possible to include a Deactivation Indication IE with a value "deactivated" in an "eNB Configuration Update" message sent from an eNB 28 or an HeNB 30 to another eNB 28 or HeNB 30. One possibility is to extend this with a dedicated value for "power down," "HeNB power down," or some similar dedicated value.

Upon being notified that the HeNB 30 is unavailable, the X2-GW 40 then notifies one or more eNBs 28-1 through 28-3 with which the HeNB 30 has an X2 connection that the HeNB 30 is unavailable (steps 404-1 through 404-3). In order to accomplish this, in one embodiment, the X2-GW 40 uses a table indicating, for each associated eNB 28 and HeNB 30, a list of other eNBs 28 and HeNBs 30 to which the eNB 28/HeNB 30 has X2 connections to each other eNB 28 and HeNB 30. This table can be produced by any suitable means. As one example, the X2-GW 40 could compile such a table during the process described in step 202 of FIG. 8 where an eNB 28 initiates a connection to an HeNB 30 using the X2-GW 40 as a gateway.

The eNBs 28-1 through 28-3 then cease communication attempts with the HeNB 30 until the eNBs 28-1 through 28-3 are notified that the HeNB 28 is again available (steps 406-1 through 406-3). In this embodiment, sometime thereafter, the HeNB 30 determines that the HeNB 30 is in an available state (step 408) and, in response, notifies the X2-GW 40 that the HeNB 30 is available (step 410). The X2-GW 40 then notifies the one or more eNBs 28-1 through 28-3 that the HeNB 30 is available (steps 412-1 through 412-3). After the one or more eNBs 28-1 through 28-3 are notified that the HeNB 30 is available, the one or more eNBs 28-1 through 28-3 reestablish the X2 communication connections with the HeNB 30 (steps 414-1 through 414-3). While they are not shown, there can be several other messages between the eNBs 28, the HeNB 30, and the X2-GW 40 in order to reestablish X2 communication.

In FIG. 10B, first the HeNB 30 determines that it is transitioning to an unavailable state (step 500). This determination can be in response to the HeNB 30 being powered down or otherwise transitioning to unavailability. Next, the HeNB 30 notifies the X2-GW 40 that the HeNB 30 is unavailable (step 502). In one embodiment, this notification is accomplished by sending an SCTP message over an X2 connection. More specifically, the message could be an SCTP message with a SHUTDOWN chunk or an ERROR chunk with a predefined reason in the Upper Layer Abort Reason field 58 that indicates that the HeNB 30 is unavailable. Note that the SCTP message is just one preferred embodiment and that the notification can be accomplished using any suitable means. The X2-GW 40 then notifies one or more eNBs 28-1 through 28-3 with which the HeNB 30 has an X2 connection that the HeNB 30 is unavailable (steps 504-1 through 504-3). The eNBs 28-1 through 28-3 then cease communication attempts with the HeNB 30 for a predetermined time period (steps 506-1 through 506-3). In one embodiment, after the predetermined time period has expired, the one or more eNBs 28-1 through 28-3 attempt to reestablish the X2 communication connections with the HeNB 30 (steps 508-1 through 508-3).

Figure 11:
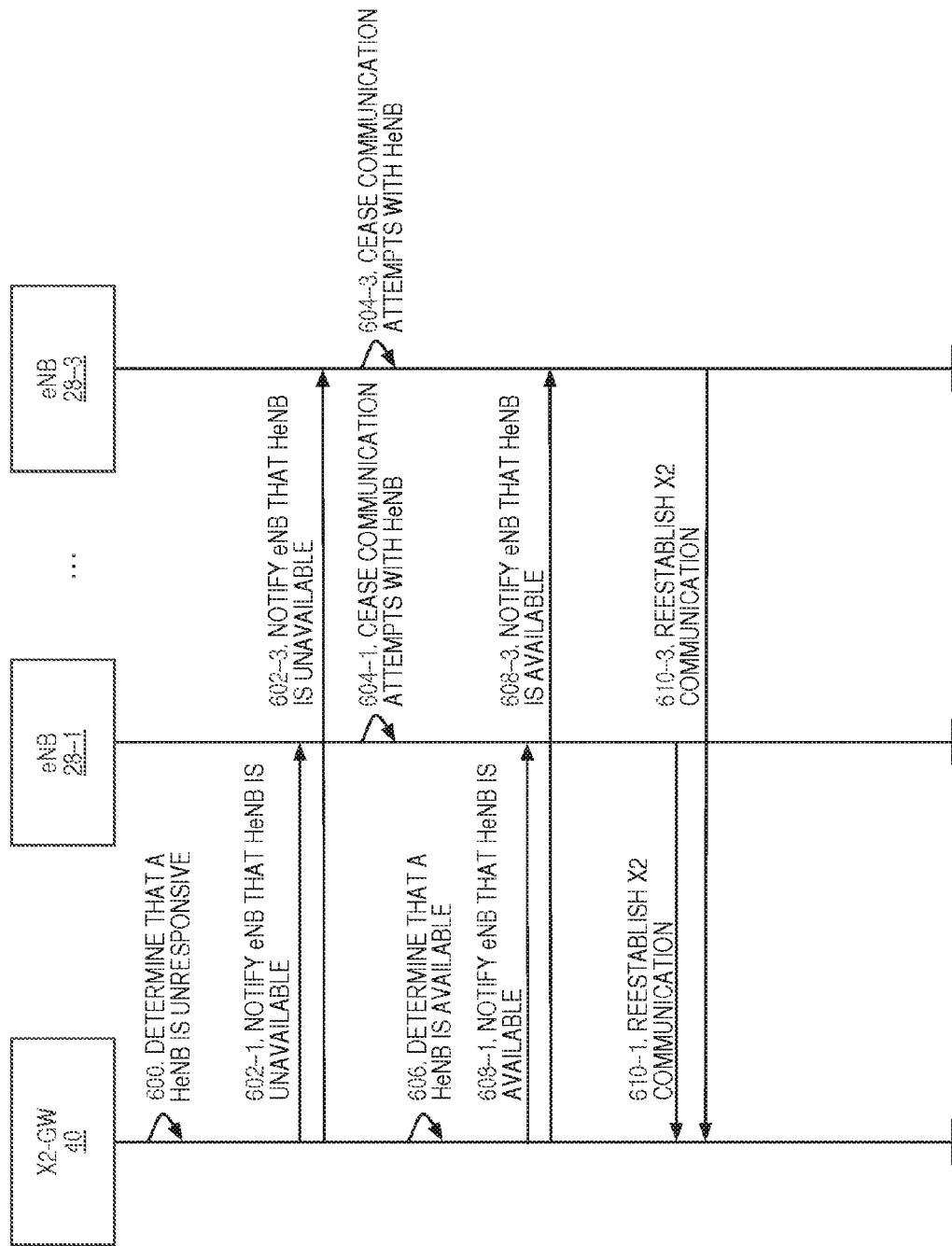
FIG. 11 illustrates the operation of the heterogeneous LTE cellular communication network of FIG. 3, where the X2-GW directly notifies one or more eNBs that an HeNB is unavailable as determined by the X2-GW according to one embodiment of the present disclosure.

In some embodiments, it is not necessary for an HeNB 30 to notify other elements in the heterogeneous LTE cellular communication network 24 about the unavailability of the HeNB 30. In this regard, FIG. 11 illustrates the operation of the heterogeneous LTE cellular communication network 24 of FIG. 3 according to one embodiment of the present disclosure where the X2-GW 40 directly notifies one or more eNBs 28 that an HeNB 30 is unavailable as determined by the X2-GW 40. First, the X2-GW 40 determines that an HeNB 30 is unresponsive (step 600). This determination can be in response to, for example, repeated failed attempts to contact the HeNB 30 by the X2-GW 40. The X2-GW 40 then notifies one or more eNBs 28-1 through 28-3 with which the HeNB 30 has an X2 connection that the HeNB 30 is unavailable (steps 602-1 through 602-3). In order to accomplish this, in one embodiment, the X2-GW 40 uses a table indicating, for each associated eNB 28 and HeNB 30, a list of other eNBs 28 and HeNBs 30 to which the eNB 28/HeNB 30 has X2 connections to each other eNB 28 and HeNB 30. This table can be produced by any suitable means. As one example, the X2-GW 40 could compile such a table during the process described in step 202 of FIG. 8 where an eNB 28 initiates a connection to an HeNB 30 using the X2-GW 40 as a gateway. The one or more eNBs 28-1 through 28-3 then cease communication attempts with the HeNB 30 (steps 604-1 through 604-3).

In this embodiment, the X2-GW 40 subsequently determines that the HeNB 30 is again in an available state (step 606). The X2-GW 40 then notifies the one or more eNBs 28-1 through 28-3 that the HeNB 30 is available (steps 608-1 through 608-3). After the one or more eNBs 28-1 through 28-3 are notified that the HeNB 30 is available, the one or more eNBs 28-1 through 28-3 reestablish the X2 communication connections with the HeNB 30 (steps 610-1 through 610-3). As discussed above, while they are not shown, there can be several other messages between the eNBs 28, the HeNB 30, and the X2-GW 40 in order to reestablish X2 communication.

Figure 12:
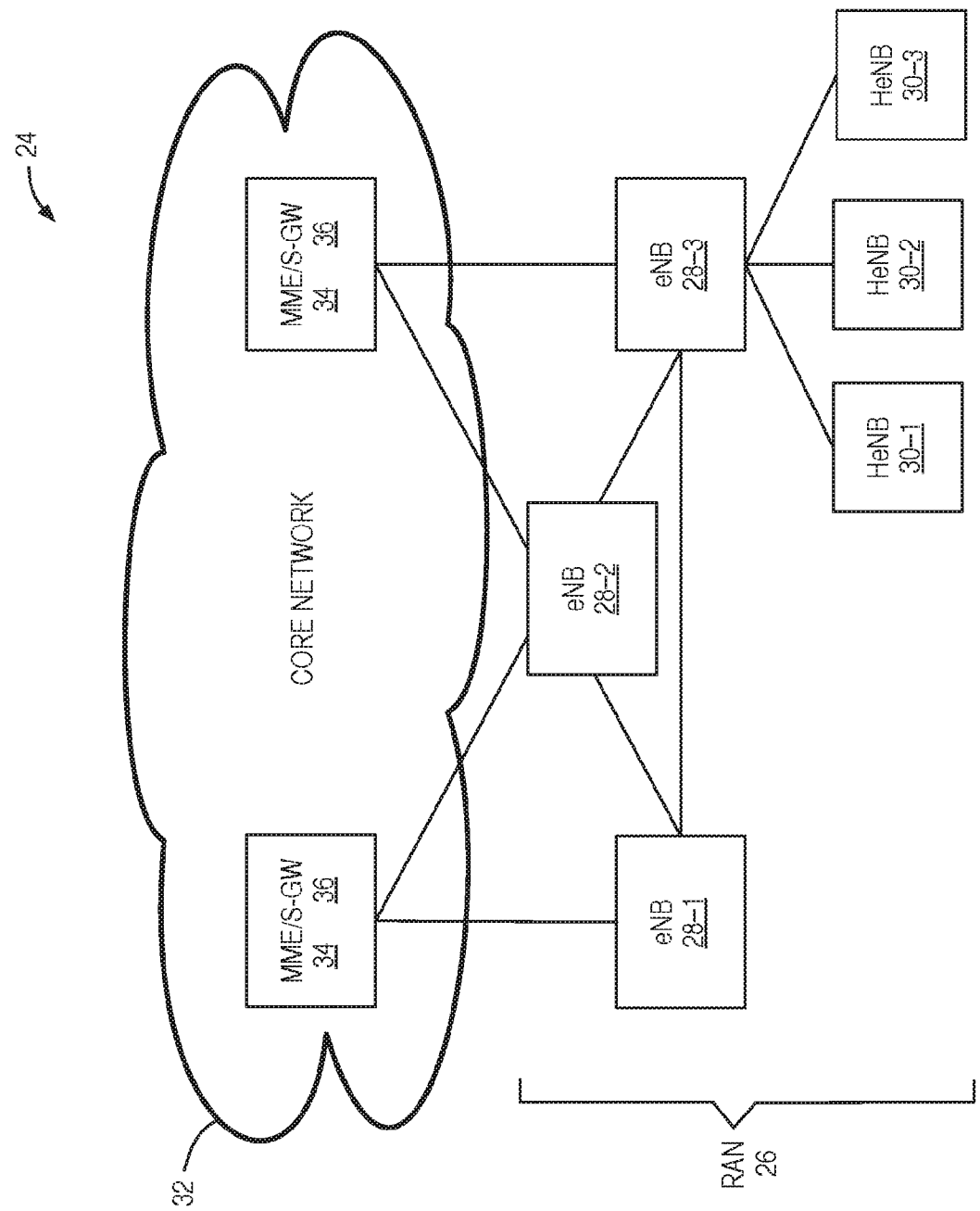
FIG. 12 illustrates a heterogeneous LTE cellular communication network in which one base station notifies other base stations of its unavailability according to another embodiment of the present disclosure.

FIGS. 10A, 10B, and 11 illustrate embodiments in which an eNB 28 is notified of the unavailability of an HeNB 30 via the X2-GW 40. However, the present disclosure is not limited thereto. More generally, the concepts disclosed herein can be used by any base station to directly notify another base station of its unavailability. In this regard, FIG. 12 illustrates one embodiment of the heterogeneous LTE cellular communication network 24 in which the HeNBs 30 directly notify other HeNBs 30 and/or eNB(s) 28 with which they have X2 connections when the HeNBs 30 become unavailable. The same process can be used by the eNB(s) 28 to notify other eNBs 28 and/or HeNB(s) 30 with which they have X2 connections when the eNB(s) 28 become unavailable.

Figure 13A:
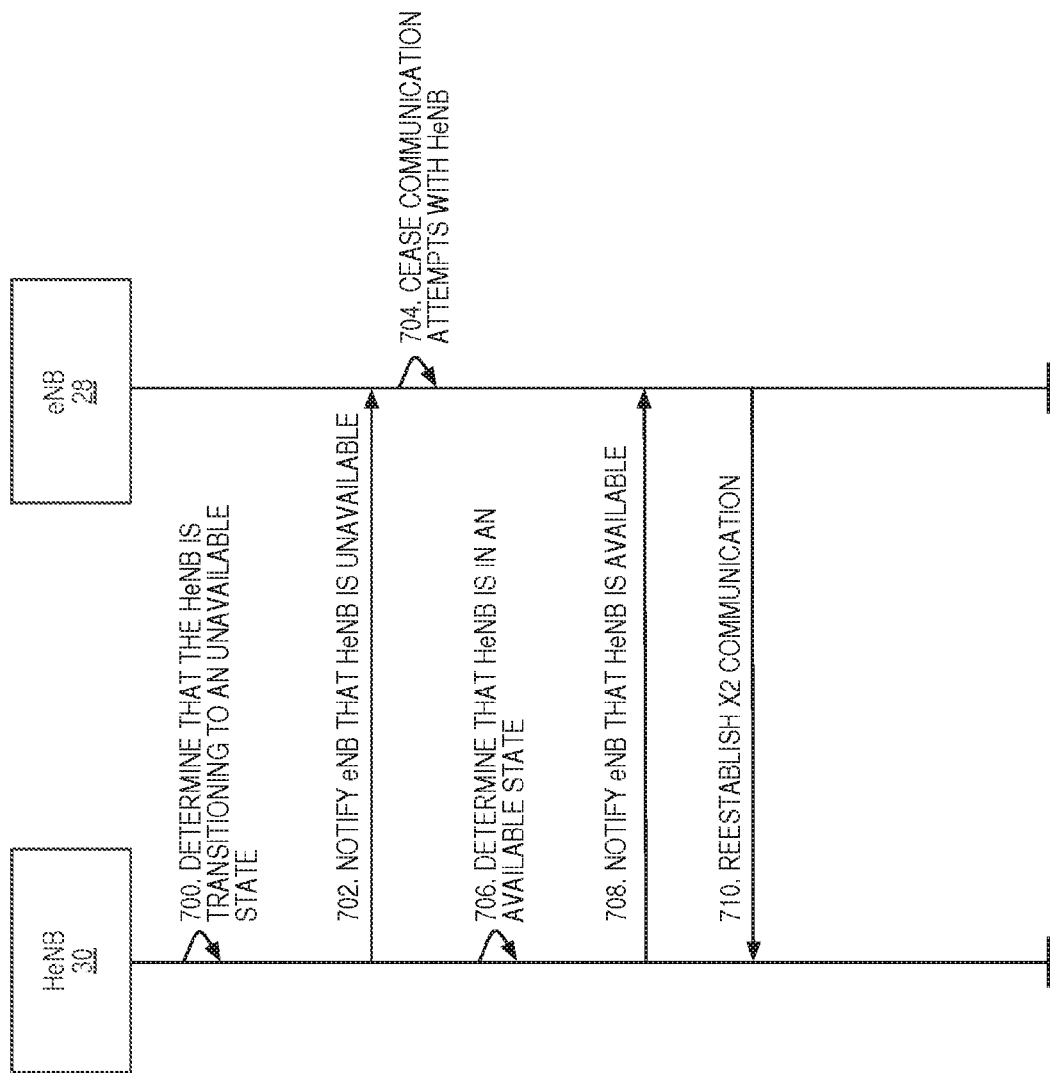
FIGS. 13A and 13B illustrate the operation of the heterogeneous LTE cellular communication network of FIG. 12 where an HeNB directly notifies one or more eNBs that the HeNB is unavailable according to one embodiment of the present disclosure.
Figure 13B:
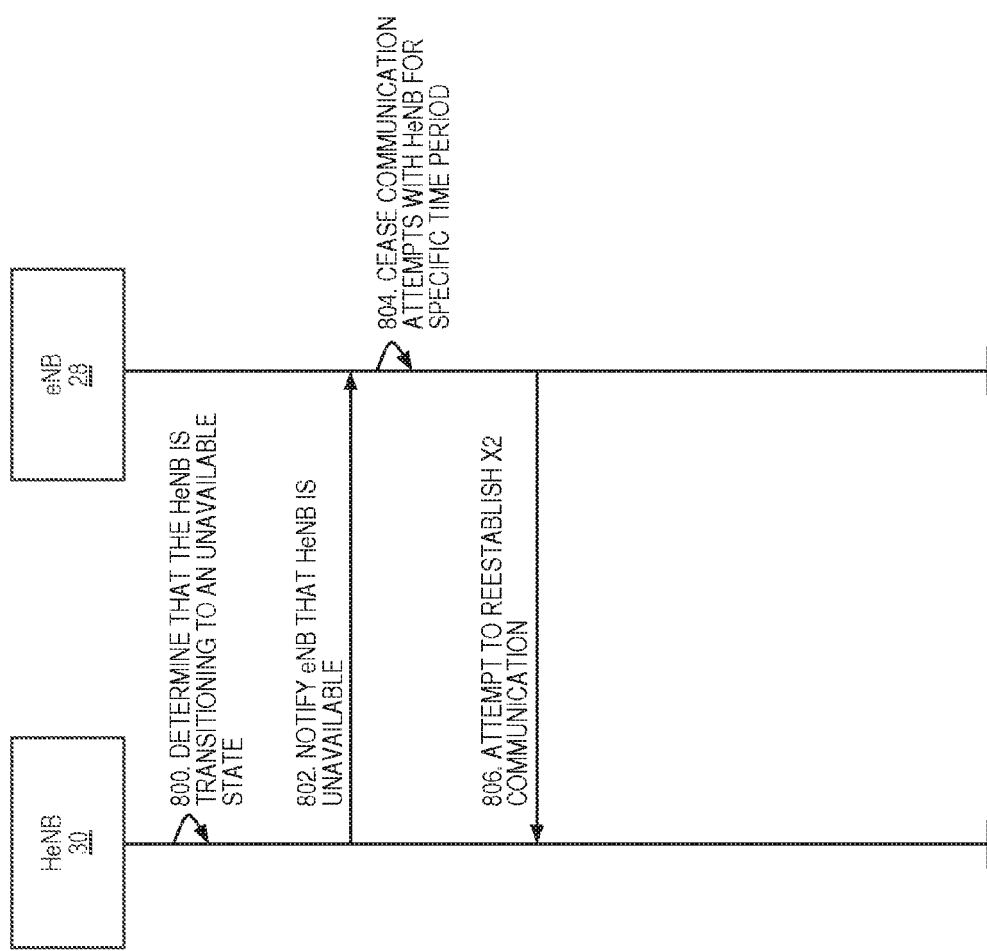

FIGS. 13A and 13B illustrate the operation of the heterogeneous LTE cellular communication network 24 of FIG. 12 where an HeNB 30 directly notifies one or more eNBs 28 that the HeNB 30 is unavailable according to one embodiment of the present disclosure. FIG. 13A illustrates the scenario where the eNB 28 ceases communication attempts with the HeNB 30 until the eNB 28 is notified that the HeNB 30 is available. Conversely, FIG. 13B illustrates the scenario where the eNB 28 ceases communication attempts with the HeNB 30 for a specific period of time.

In FIG. 13A, first the HeNB 30 determines that it is transitioning to an unavailable state (step 700). This determination can be in response to the HeNB 30 being powered down or otherwise transitioning to unavailability. Next, in response to determining that the HeNB 30 is transitioning to the unavailable state, the HeNB 30 notifies the eNB 28 that the HeNB 30 is unavailable (step 702). In one embodiment, this notification is accomplished by sending an SCTP message over an X2 connection. More specifically, the message could be an SCTP message with a SHUTDOWN chunk or an ERROR chunk with a predefined reason in the Upper Layer Abort Reason field 58 that indicates that the HeNB 30 is unavailable. Note that the SCTP message is just one preferred embodiment and that the notification can be accomplished using any suitable means. The eNB 28 then ceases communication attempts with the HeNB 30 until the eNB 28 is notified that the HeNB 30 is available again (step 704). In this embodiment, sometime thereafter, the HeNB 30 determines that the HeNB 30 is in an available state (step 706) and, in response, notifies the eNB 28 that the HeNB 30 is available (step 708). Lastly, after the eNB 28 is notified that the HeNB 30 is available, the eNB 28 reestablishes the X2 communication connection with the HeNB 30 (step 710).

In FIG. 13B, first the HeNB 30 determines that it is transitioning to an unavailable state (step 800). This determination can be in response to the HeNB being powered down or otherwise transitioning to unavailability. Next, the HeNB 30 notifies the eNB 28 that the HeNB 30 is unavailable (step 802). In one embodiment, this notification is accomplished by sending an SCTP message over an X2 connection. As described above with regard to FIG. 13A, the message could be an SCTP message with a SHUTDOWN chunk or an ERROR chunk with a predefined reason in the Upper Layer Abort Reason field 58 that indicates that the HeNB 30 is unavailable. Note that the SCTP message is just one preferred embodiment and that the notification can be accomplished using any suitable means. The eNB 28 then ceases communication attempts with the HeNB 30 for a predetermined time period (step 804). In one embodiment, after the predetermined time period has expired, the eNB 28 attempts to reestablishes the X2 communication connection with the HeNB 30 (step 806).

Figure 14:
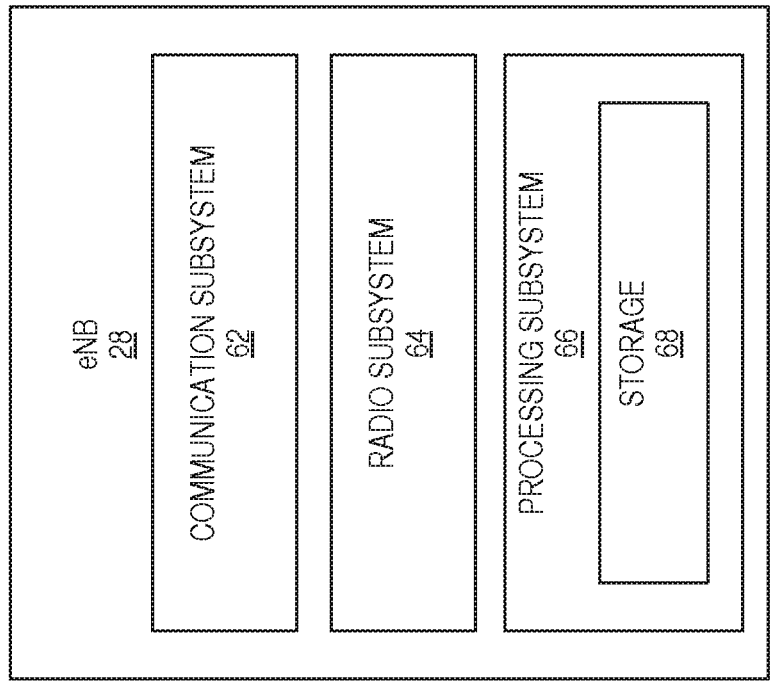
FIG. 14 is a block diagram of one of the eNBs of FIG. 3 according to one embodiment of the present disclosure.

FIG. 14 is a block diagram of one of the eNBs 28 of FIG. 3 according to one embodiment of the present disclosure. As illustrated, the eNB 28 includes a communication subsystem 62, a radio subsystem 64 that includes one or more radio units (not shown), and a processing subsystem 66 that includes storage 68. The communication subsystem 62 generally includes analog and, in some embodiments, digital components for sending and receiving communications to and from the X2-GW 40 and in some embodiments, the HeNBs 30 and/or other eNBs 28. The radio subsystem 64 generally includes analog and, in some embodiments, digital components for wirelessly sending and receiving messages to and from the UE 60 in the heterogeneous LTE cellular communication network 24.

The processing subsystem 66 is implemented in hardware or in a combination of hardware and software. In particular embodiments, the processing subsystem 66 may comprise, for example, one or several general-purpose or special-purpose microprocessors or other microcontrollers programmed with suitable software and/or firmware to carry out some or all of the functionality of the eNB 28 described herein. In addition or alternatively, the processing subsystem 66 may comprise various digital hardware blocks (e.g., one or more Application Specific Integrated Circuits (ASICs), one or more off-the-shelf digital and analog hardware components, or a combination thereof) configured to carry out some or all of the functionality of the eNB 28 described herein. Additionally, in particular embodiments, the above-described functionality of the eNB 28 may be implemented, in whole or in part, by the processing subsystem 66 executing software or other instructions stored on a non-transitory computer-readable medium, such as Random Access Memory (RAM), Read Only Memory (ROM), a magnetic storage device, an optical storage device, or any other suitable type of data storage component.

Figure 15:
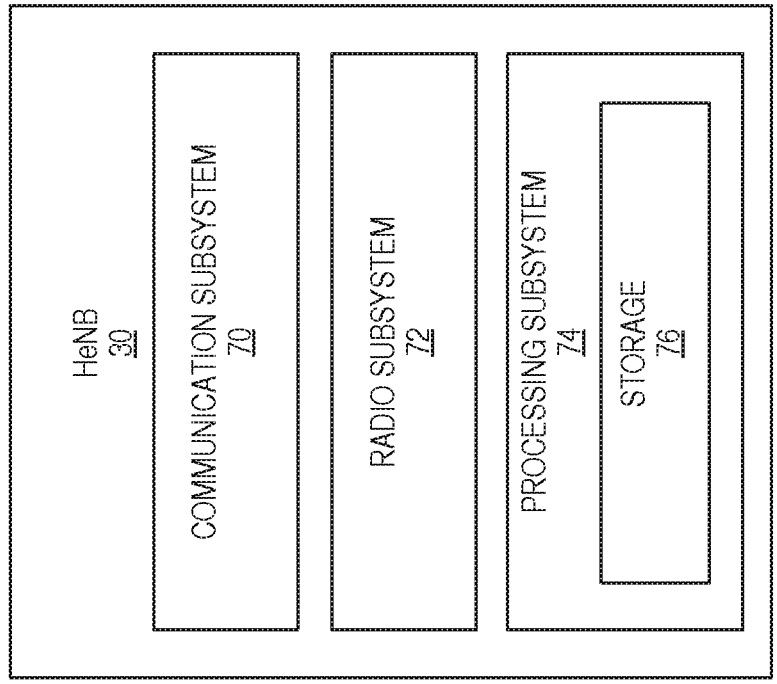
FIG. 15 is a block diagram of one of the HeNBs of FIG. 3 according to one embodiment of the present disclosure.

FIG. 15 is a block diagram of one of the HeNBs 30 of FIG. 3 according to one embodiment of the present disclosure. As illustrated, the HeNB 30 includes a communication subsystem 70, a radio subsystem 72 that includes one or more radio units (not shown), and a processing subsystem 74 that includes storage 76. The communication subsystem 70 generally includes analog and, in some embodiments, digital components for sending and receiving communications to and from the X2-GW 40, and in some embodiments, the eNBs 28 and other HeNBs 30. The radio subsystem 72 generally includes analog and, in some embodiments, digital components for wirelessly sending and receiving messages to and from the UE 60 in the heterogeneous LTE cellular communication network 24.

The processing subsystem 74 is implemented in hardware or in a combination of hardware and software. In particular embodiments, the processing subsystem 74 may comprise, for example, one or several general-purpose or special-purpose microprocessors or other microcontrollers programmed with suitable software and/or firmware to carry out some or all of the functionality of the HeNB 30 described herein. In addition or alternatively, the processing subsystem 74 may comprise various digital hardware blocks (e.g., one or more ASICs, one or more off-the-shelf digital and analog hardware components, or a combination thereof) configured to carry out some or all of the functionality of the HeNB 30 described herein. Additionally, in particular embodiments, the above-described functionality of the HeNB 30 may be implemented, in whole or in part, by the processing subsystem 74 executing software or other instructions stored on a non-transitory computer-readable medium, such as RAM, ROM, a magnetic storage device, an optical storage device, or any other suitable type of data storage component.

FIG. 16 is a block diagram of the X2-GW 40 of FIG. 3 according to one embodiment of the present disclosure. As illustrated, the X2-GW 40 includes a communication subsystem 78 and a processing subsystem 80 that includes storage 82. The communication subsystem 78 generally includes analog and, in some embodiments, digital components for sending and receiving communications to and from the HeNBs 30 and eNBs 28. The storage 82 can be on a non-transitory computer-readable medium, such as RAM, ROM, a magnetic storage device, an optical storage device, or any other suitable type of data storage component.

The processing subsystem 80 is implemented in hardware or in a combination of hardware and software. In particular embodiments, the processing subsystem 80 may comprise, for example, one or several general-purpose or special-purpose microprocessors or other microcontrollers programmed with suitable software and/or firmware to carry out some or all of the functionality of the X2-GW 40 described herein. In addition or alternatively, the processing subsystem 80 may comprise various digital hardware blocks (e.g., one or more ASICs, one or more off-the-shelf digital and analog hardware components, or a combination thereof) configured to carry out some or all of the functionality of the X2-GW 40 described herein. Additionally, in particular embodiments, the above-described functionality of the X2-GW 40 may be implemented, in whole or in part, by the processing subsystem 80 executing software or other instructions stored on a non-transitory computer-readable medium, such as RAM, ROM, a magnetic storage device, an optical storage device, or any other suitable type of data storage component.

The following acronyms are used throughout this disclosure.

3GPP $3^{rd}$ Generation Partnership Project
ANR Automatic Neighbor Relation
ASIC Application Specific Integrated Circuit
BS Base Station
BS-BS GW Base Station to Base Station Gateway
CSG Closed Subscriber Group
DNS Domain Name System
E-UTRAN Evolved Universal Terrestrial Radio Access Network
ECGI E-UTRAN Cell Global Identifier
ECI E-UTRAN Cell Identifier
eNB Evolved/E-UTRAN Node B
FQDN Fully Qualified Domain Name
HeNB Home Evolved/E-UTRAN Node B
HP-BS High-Power Base Station
IMSI International Mobile Subscriber Identity
IP Internet Protocol
IPsec IP Security
LP-BS Low-Power Base Station
LTE Long Term Evolution
MCC Mobile Country Code
MME Mobility Management Entity
MNC Mobile Network Code
PCI Physical Cell ID
PLMN Public Land Mobile Network
RAM Random Access Memory
RAN Radio Access Network
ROM Read Only Memory
SCTP Stream Control Transmission Protocol
S-GW Serving Gateway
SeGW Security Gateway
SON Self Organizing Network
TAC Tracking Area Code
TAI Tracking Area Identity
TNL Transport Network Layer
UE User Equipment Device
X2-GW X2 Gateway Those skilled in the art will recognize improvements and modifications to the preferred embodiments of the present disclosure. All such improvements and modifications are considered within the scope of the concepts disclosed herein and the claims that follow.

What is claimed is:

1. A method of operation of an evolved NodeB (eNB) in a Long Term Evolution cellular communication network, the method comprising:
   obtaining a network address of an X2 Gateway (X2-GW) associated with a second base station;
   sending a Stream Control Transmission Protocol Initiation (INIT) message to the X2-GW, via the network address, to initiate a connection to the second base station; and
   receiving a Stream Control Transmission Protocol ERROR message from the X2-GW that indicates the X2-GW is an X2-GW.

2. The method of claim 1 wherein the eNB is a high-power base station and the second base station is a low-power base station.

3. The method of claim 2 wherein the low-power base station is selected from the group consisting of a microcell eNB, a picocell eNB, a femtocell eNB, and a Home eNB.

4. The method of claim 2 further comprising:
   obtaining a hostname of the low-power base station.

5. The method of claim 4 wherein obtaining the hostname comprises determining a fully qualified domain name of the low-power base station based on identification information of the low-power base station.

6. The method of claim 5 wherein the identification information of the low-power base station is obtained through an automatic neighbor relation process.

7. The method of claim 2 further comprising:
   sending a message to the X2-GW that is addressed to the low-power base station using a hostname of the low-power base station.

8. The method of claim 7 wherein sending the message comprises sending the message to the X2-GW via an X2 connection between the eNB and the X2-GW.

9. An evolved NodeB (eNB) for use in a Long Term Evolution cellular communication network, the eNB comprising:
   a radio subsystem configured to provide wireless communication with one or more wireless devices served by the first base station;
   a communication subsystem configured to communicatively couple the eNB to an X2 Gateway (X2-GW); and
   a processing subsystem associated with the communication subsystem and the radio subsystem configured to:
      obtain a network address of the X2-GW associated with a second base station;
      send a Stream Control Transmission Protocol Initiation (INIT) message to the X2-GW, via the communication subsystem, to initiate a connection to the second base station; and
      receive a Stream Control Transmission Protocol ERROR message from the X2-GW that indicates the X2-GW is an X2-GW.

10. The eNB of claim 9 wherein the eNB is a high-power base station and the second base station is a low-power base station.

11. The eNB of claim 10 wherein the low-power base station is selected from the group consisting of a microcell eNB, a picocell eNB, a femtocell eNB, and a Home eNB.

12. The eNB of claim 10 wherein the processing subsystem is further configured to:
   obtain a hostname of the low-power base station.

13. The eNB of claim 12 wherein:
   in order to obtain the hostname, the processing subsystem is further configured to determine a fully qualified domain name of the low-power base station based on identification information of the low-power base station.

14. The eNB of claim 13 wherein the identification information of the low-power base station is obtained through an automatic neighbor relation process.

15. The eNB of claim 12 wherein the processing subsystem is further configured to:
   send a message to the X2-GW via the communication subsystem that is addressed to the low-power base station using the hostname of the low-power base station.

16. The eNB of claim 15 wherein in order to send the message to the X2-GW, the processing subsystem is further configured to send the message to the X2-GW via an X2 connection between the eNB and the X2-GW.

* * * * *